United States Patent
Uemura et al.

(10) Patent No.: US 6,311,763 B1
(45) Date of Patent: Nov. 6, 2001

(54) VEHICLE AIR CONDITIONER

(75) Inventors: Yukio Uemura, Nagoya; Noriyoshi Miyajima, Nukata-gun, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/552,612

(22) Filed: Apr. 19, 2000

(30) Foreign Application Priority Data

Apr. 28, 1999 (JP) .................................................. 11-122470
Feb. 17, 2000 (JP) .................................................. 12-045138

(51) Int. Cl.[7] .................................................. B60H 1/04
(52) U.S. Cl. .................................................. 165/43; 62/244
(58) Field of Search ........................ 237/12.3 A; 62/244; 165/42, 43

(56) References Cited

U.S. PATENT DOCUMENTS

| | | | |
|---|---|---|---|
| 4,125,150 | * 11/1978 | Zelger et al. | 165/42 |
| 4,460,036 | * 7/1984 | Yoshimi et al. | 62/244 |
| 4,604,873 | 8/1986 | Ohashi et al. | 62/158 |
| 4,791,981 | 12/1988 | Ito | 165/42 |
| 5,016,704 | * 5/1991 | Ono | 237/12.3 A |
| 5,181,553 | * 1/1993 | Doi | 237/12.3 A |
| 5,390,728 | * 2/1995 | Ban | 62/244 |
| 5,775,407 | * 7/1998 | Inoue | 237/12.3 A |
| 6,145,754 | * 11/2000 | Uemura et al. | 237/12.3 A |

FOREIGN PATENT DOCUMENTS 6-40236 * 2/1994 (JP) .
A-6-40236 2/1994 (JP) .
A-10-109520 4/1998 (JP) .

* cited by examiner

Primary Examiner—William E. Tapolcai
(74) Attorney, Agent, or Firm—Harness, Dickey & Pierce, PLC

(57) ABSTRACT

In a vehicle air conditioner, a first air passage through which outside air flows and a second air passage through which inside air flows are provided to be partitioned from each other, so that outside air in the first air passage is blown toward a front seat side of a passenger compartment from a front air outlet after passing through a first part of a heat exchanger, and inside air in the second air passage is blown toward a rear seat side of the passenger compartment from a rear air outlet after passing through a second part of the heat exchanger, during a double layer flow mode. Thus, in the second air passage, temperature of air sucked from an inside air port can be set to temperature of inside air inside the passenger compartment, while air pressure loss due to an inside air suction is decreased. As a result, in the vehicle air conditioner, air-conditioning capacity for the rear seat side is improved.

16 Claims, 14 Drawing Sheets

VEHICLE AIR CONDITIONER

CROSS-REFERENCE TO RELATED APPLICATION

This application is related to and claims priority from Japanese Patent Applications No. Hei. 11-122470 filed on Apr. 28, 1999, and No. 2000-45138 filed on Feb. 17, 2000, the contents of which are hereby incorporated by reference.

BACKGROUND OF THE INVENTION

1. Field of the Invention

The present invention relates to a vehicle air conditioner having a front air-blowing structure for blowing air toward a front seat side of a passenger compartment and a rear air-blowing structure for blowing air toward a rear seat side of the passenger compartment.

2. Description of Related Art

In a conventional vehicle air conditioner, for improving both heating performance for heating air blown toward the foot area of a passenger and defrosting performance of a windshield in the winter, an inside/outside air double layer flow mode (hereinafter, referred to as "double layer flow mode") is set so that circulated inside air having a high temperature is blown from a foot opening and outside air having a low-humidity is blown from a defroster opening.

For example, in an air conditioner described in JP-A-10-109520 by the applicant of the present invention, a warm air bypass opening and a warm air bypass door are disposed at an immediately downstream position of a heating heat exchanger, and a front foot opening and a rear foot opening are provided at a downstream air side of the warm air bypass opening in an air flow direction. When the double layer flow mode is set during a maximum heating, the warm air bypass opening is opened by the warm air bypass door, and an air passage immediately downstream from the heating heat exchanger is partitioned by the warm air bypass door into a first air passage through which outside air flows and a second air passage through which inside air flows.

However, during a temperature control area, the double layer flow mode is removed, and the warm air bypass door closes the warm air bypass opening. In this case, warm air having passed through the heating heat exchanger flows upwardly and is mixed with cool air bypassing the heating heat exchanger, and thereafter, mixed air is blown toward the foot opening. Thus, during the temperature control area, pressure loss is increased due to a bent air flow. Because a duct having a relative small sectional area is used as a rear foot duct connected to a rear foot opening due to an arrangement space in a vehicle, an air amount blown toward a rear seat side in a passenger compartment is greatly decreased during the temperature control area. Further, because the rear foot duct is necessary to have a long distance pipe from an air conditioning unit disposed at a vehicle front side to a rear seat side, heat loss becomes larger in a rear foot duct, and temperature of air blown toward the rear seat side becomes lower. As a result, heating capacity for the rear seat side of the passenger compartment becomes insufficient. On the other hand, even during a cooling mode, because a long rear face duct from the air conditioning unit to a rear seat side is also necessary, cooling capacity for the rear seat side of the passenger compartment becomes insufficient.

SUMMARY OF THE INVENTION

In view of the foregoing problems, it is an object of the present invention to provide a vehicle air conditioner having a front air-blowing structure and a rear air-blowing structure, which improves heating capacity and cooling capacity for a rear seat side of a passenger compartment.

According to a first aspect of the present invention, a vehicle air conditioner includes a blower unit for blowing inside air inside a passenger compartment and outside air outside the passenger compartment while partitioning inside air and outside air from each other, a partition member for partitioning an air passage into a first air passage through which outside air flows by the blower unit and a second air passage through which inside air flows by the blower unit, and a heating heat exchanger for heating air flowing through the first air passage and the second air passage. The partition member is disposed in such a manner that outside air in the first air passage flows into a front air opening and inside air in the second air passage flows into a rear air opening while partitioning the rear air opening and the front air opening, during a double layer flow mode. Thus, outside air in the first air passage can be blown toward a front seat side of the passenger compartment from the front air opening, while inside air in the second air passage can be blown toward a rear seat side of the passenger compartment. Therefore, it is possible to increase temperature of inside air sucked into the second air passage until the temperature of inside air inside the passenger compartment, and pressure loss due to an inside air suction can be reduced. Further, the heating heat exchanger is disposed to heat outside air in the first air passage and to heat inside air in the second air passage, during the double layer flow mode. As a result, temperature and an amount of air blown toward the rear seat side are increased, and heating capacity for the rear seat side is improved. Further, because outside air in the first air passage is blown toward the front seat side, defrosting performance of the windshield is improved. In the present invention, a partition state between the first air passage and the second air passage generally indicates an approximate perfect partition state. However, the partition state includes a slight mixing state between outside air in the first air passage and inside air in the second air passage.

According to a second aspect of the present invention, in a vehicle air conditioner, a partition member is disposed for partitioning an air passage into a first air passage from which outside air flows toward a front seat side of the passenger compartment through a front air opening and a second air passage from which inside air flows toward a rear seat side of the passenger compartment through a rear air opening, and a cooling heat exchanger is disposed to form a bypass passage in the second air passage, through which air bypasses the cooling heat exchanger in the second air passage. Therefore, the pressure loss in the second air passage is reduced, and an air amount blowing toward the rear seat side is increased. Further, during a cooling mode, low-temperature inside air having been cooled can be sucked into the second air passage. Thus, during the cooling mode, cooling capacity for the rear seat side of the passenger compartment is improved.

According to a third aspect of the present invention, a vehicle air conditioner includes a blower unit for blowing inside air into a first air passage through which inside air flows and for blowing outside air into a second air passage through which outside air flows, a heating heat exchanger for heating air flowing from the first air passage and the second air passage, a first partition member for partitioning an air-flowing passage of the heating heat exchanger into a front air passage through which outside air from the first air passage and inside air from the second air passage flow and a rear air passage through which inside air from the second air passage flows, and a second partition member for further partitioning the front air passage into a front outside air passage through which outside air from the first air passage flows and a front inside air passage through which inside air from the second air passage flows. The first and second partition members are disposed in such a manner that: outside air from the first air passage flows into a defroster opening through the front outside air passage of the heating heat exchanger, inside air from the second air passage flows into a front foot opening through the front inside air passage of the heating heat exchanger, and inside air from the second air passage flows into a rear air opening through the rear air passage of the heating heat exchanger. Thus, during a heating mode, high-temperature inside air is blown from the front foot opening, and low-humidity outside air is blown toward an inner surface of a windshield through the defroster opening. Therefore, heating performance for a front foot side and defrosting performance of the windshield is improved. Further, even in a rear seat side of the passenger compartment, the high-temperature inside air is blown toward a rear seat side through the rear air opening, and heating performance for the rear seat side of the passenger compartment is improved.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PREFERRED EMBODIMENTS

Preferred embodiments of the present invention will be described hereinafter with reference to the accompanying drawings.

A first preferred embodiment of the present invention will be now described with reference to FIGS. 1–6. In a vehicle air conditioner of the first embodiment, it is possible to set a double layer flow mode in which outside air (i.e., air outside a passenger compartment) is blown from a front seat side of the passenger compartment and inside air (i.e., air inside the passenger compartment) is blown from a rear seat side of the passenger compartment.

Figure 1:
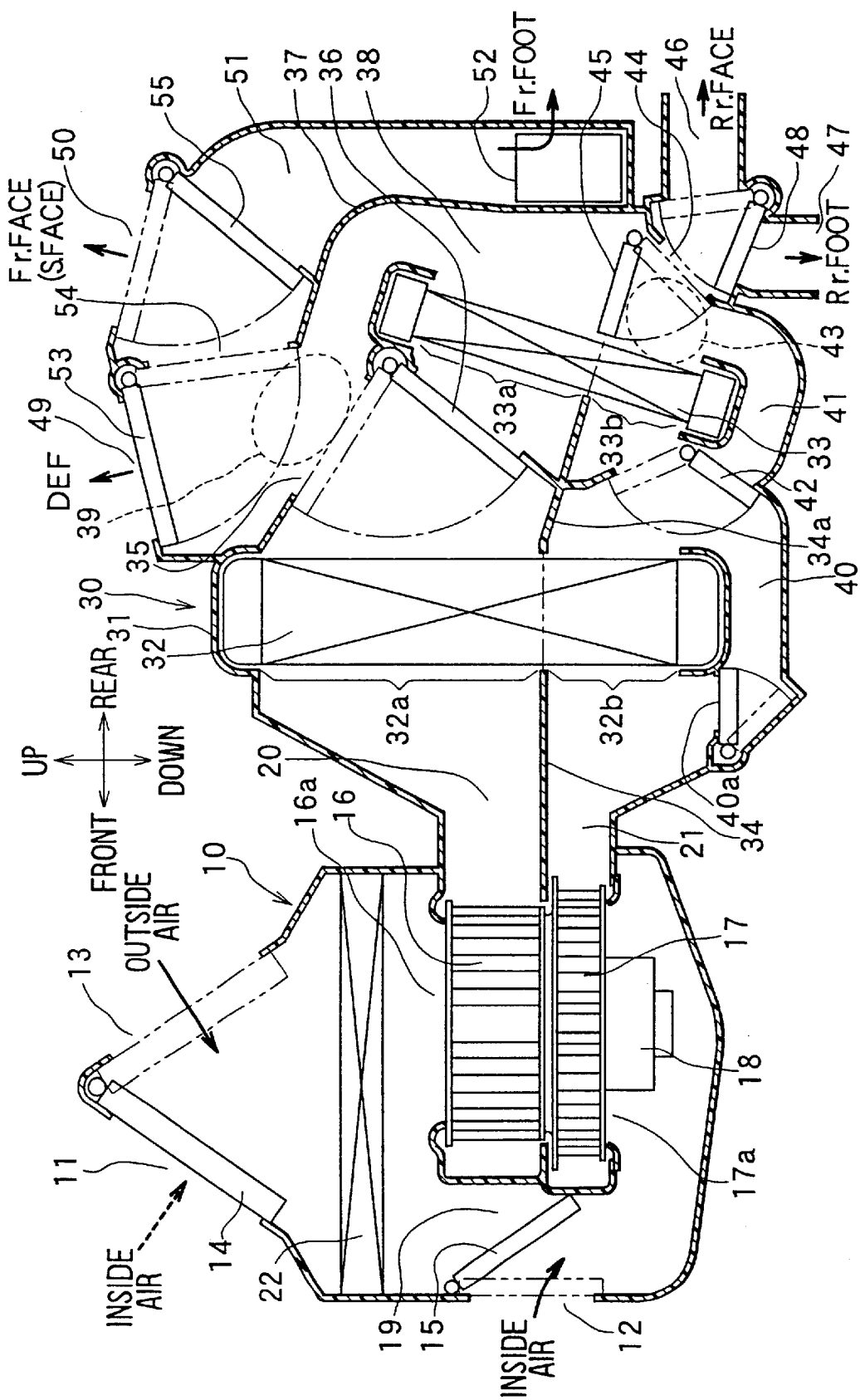
FIG. 1 is a schematic sectional view of a ventilation system of a vehicle air conditioner according to a first preferred embodiment of the present invention.

In FIG. 1, the ventilation system of the vehicle air conditioner is mainly divided into two parts of a blower unit 10 and an air conditioning unit 30. The air conditioning unit 30 is generally disposed under an instrument panel within a passenger compartment at an approximate center in a vehicle right-left direction (i.e., vehicle width direction). On the other hand, the blower unit 10 is generally disposed under the instrument panel within the passenger compartment to be offset from the air conditioning unit 30 at a front-passenger's seat side in the vehicle right-left direction.

The air conditioning unit 30 is mounted on the vehicle to correspond to the arrangement in FIG. 1 in a vehicle up-down direction and in a vehicle front-rear direction. On the other hand, the blower unit 10 is generally disposed to be offset from the air conditioning unit 30 in the vehicle right-left direction on a front passenger's seat side. However, in FIG. 1, for readily indicating both the blower unit 10 and the air conditioning unit 30, the blower unit 10 is arranged on a vehicle front side of the air conditioning unit 30.

Firstly, the blower unit 10 is described in detail. The blower unit 10 includes first and second inside air introduction ports 11, 12 from which inside air (i.e., air inside the passenger compartment) is introduced, and an outside air introduction portion 13 from which outside air (i.e., air outside the passenger compartment) is introduced. The first inside air introduction port 11, the second inside air introduction port 12 and the outside air introduction port 13 are selectively opened and closed by first and second inside/outside air switching doors 14, 15. Each of the first and second inside/outside air switching doors 14, 15 is a plate-like door rotatable around a rotation shaft.

The blower unit 10 has a blower case, and first and second fans 16, 17 overlapped in an up-down direction within the blower case. The first and second fans 16, 17 are composed of centrifugal multi-blades fans and are rotated simultaneously by a single common electrical motor 18.

FIG. 1 shows an operation state of the air conditioner during the double layer flow mode. During the double layer flow mode, the first inside/outside air switching door 14 closes the first inside air introduction port 11 and opens the outside air introduction port 13, and the second inside/outside air switching door 15 opens the second inside air introduction port 12 and closes a communication path 19. Therefore, outside air introduced from the outside air introduction port 13 is sucked into a suction port 16a of the first fan 16, and is blown into a first air passage 20. On the other hand, inside air introduced from the second inside air introduction port 12 is sucked into a suction port 17a of the second fan 17, and is blown into a second air passage 21.

In the first embodiment, the first air passage 20 is used as a front-seat side air passage while being used as an outside air passage during the double layer flow mode. On the other hand, the second air passage 21 is used as a rear-seat side air passage while being used as an inside air passage during the double layer flow mode. As shown in FIG. 1, a filter 22 for cleaning air is disposed at a downstream air side of the first inside air introduction port 11 and the outside air introduction port 13.

The air conditioning unit 30 includes an evaporator 32 and a heater core 33 integrally accommodated within an air conditioning case 31 made of resin. At an upstream air position of the evaporator 32 and a position between the evaporator 32 and the heater core 33 within the air conditioning case 31, the first air passage 20 on an upper side and the second air passage 21 on a lower side are also partitioned from each other by partition plate 34, 34a. Thus, core portions of the evaporator 32 and the heater core 33 are respectively partitioned into upper and lower parts 32a, 32b, 33a, 33b. As being known well, the evaporator 32 is a cooling heat exchanger for cooling air passing therethrough by absorbing an evaporation latent heat of refrigerant of a refrigerant cycle from air.

The heater core 33 is disposed within the air conditioning case 31 at a downstream air side of the evaporator 32 to form a predetermined distance between the heater core 33 and the evaporator 32. The heater core 33 is disposed to be inclined toward a vehicle rear side relative to the vehicle up-down direction (i.e., vertical direction) by a predetermined angle. The heater core 33 is a heating heat exchanger for heating air having passed through the evaporator 32. The heater core 33 heats air passing therethrough by using hot water (engine-cooling water) as a heating source. Further, the heater core 33 is disposed in the air conditioning case 31 to form a front bypass passage 35 (i.e., front cool air bypass passage) at an upper side of the heater core 33, through which air having passed through the evaporator 32 bypasses the heater core 33.

A front air mixing door 36 is disposed within the air conditioning case 31 between the evaporator 32 and the heater core 33 to adjust a ratio between an air amount passing through the heater core 33 and an air amount passing through the front bypass passage 35. The front air mixing door 36 is a plate like door rotatable in the vehicle up-down direction. The front air mixing doors 36 is disposed to adjust temperature of air blown toward a front seat side in the passenger compartment.

Further, a partition wall 37 extending in the vehicle up-down direction is provided at a downstream air side of the heater core 33 to have a predetermined distance between the partition wall 37 and the heater core 33, and is formed integrally with the air conditioning case 31. The partition wall 37 is provided to define a warm air passage 38 through which air immediately after passing through the heater core 33 flows upwardly. Warm air from the warm air passage 38 and cool air from the front bypass passage 35 are mixed at a front air mixing portion 39.

On the other hand, an evaporator bypass passage 40 is provided at a lower side of the evaporator 32 in an entire width area of the evaporator 32 so that air in the second air passage 21 bypasses the evaporator 32 through the evaporator bypass passage 40. The evaporator bypass passage 40 is opened and closed by an evaporator bypass door 40a. The evaporator bypass door 40a is a plate like door rotatable around a rotation shaft.

Similarly, a rear bypass passage 41 (i.e., rear cool air bypass passage) is formed at a lower side of the heater core 33 in an entire width area of the heater core 33 in the vehicle width direction. The rear bypass passage 41 is formed approximately linearly at a downstream air side of the evaporator bypass passage 40 to be continuously provided relative to the evaporator bypass passage 40. A plate-like rear air mixing door 42 for adjusting a ratio between an amount of warm air heated in the lower part 33b (i.e., the part in the second air passage 21) of the core portion of the heater core 33 and an amount of cool air passing through the rear bypass passage 41 is rotatably disposed. In the first embodiment, the rear air mixing door 42 is disposed to adjust temperature of air blown toward the rear seat side of the passenger compartment.

Warm air passing through the lower part 33b of the heater core 33 and cool air passing through the rear bypass passage 41 are mixed at a rear air mixing portion 43 provided at a position immediately downstream from the lower part 33b of the heater core 33, so that conditioned air having a predetermined temperature is obtained. A rear opening 44 is provided at a downstream air side of the rear air mixing portion 43 on a vehicle rear side in the air conditioning case 31, so that conditioned air of the rear air mixing portion 43 flows into the rear air mixing portion 44.

Further, a plate-like rear door 45 is disposed rotatably to open and close the rear opening 44 at a position immediately downstream from the heater core 33. When the rear door 45 is operated to the solid line position shown in FIG. 1, the rear door 45 opens the rear opening 44 while simultaneously partitioning the first air passage 20 and the second air passage 21 at a downstream air side of the heater core 33. That is, the rear door 45 for opening and closing the rear opening 44 is also used as a movable partition member.

A rear face opening 46 and a rear foot opening 47 are provided to be branched at a downstream air side of the rear opening 44. The rear face opening 46 and the rear foot opening 47 are opened and closed by a plate-like rotatable rear air-outlet mode door 48. The rear face opening 46 is provided for blowing cool air toward the head portion of a passenger on the rear seat in the passenger compartment through a rear face duct. Further, the rear foot opening 47 is provided for blowing warm air toward the foot portion of the passenger on the front seat in the passenger compartment through a rear foot duct.

In FIG. 1, the rear foot opening 47 is opened downwardly for readily indicating the arrangement. However, actually, the rear foot opening 47 is provided to be opened toward the rear seat side in parallel with the rear face opening 46.

A defroster opening 49 is opened on an upper surface of the air conditioning case 31 at a vehicle front side position, and is connected to a defroster air outlet through a defroster duct (not shown). Therefore, air from the defroster opening 49 is blown toward an inner surface of the windshield through the defroster duct and the defroster air outlet.

A front face opening (i.e., center face opening) 50 is opened at a vehicle rear side position from the defroster opening 49. The front face opening 50 is connected to a front center face air outlet provided at a center portion on an instrument panel, through a face duct. Therefore, air from the front face opening 50 is blown toward the head portion of a passenger on a front seat side in the passenger compartment through the face duct and the front center face air outlet.

Further, a front foot passage 51 is formed at a most vehicle rear side position within the air conditioning case 31, and a front foot opening 52 is opened at a lower end portion of the front foot passage 51. The front foot opening 52 is opened at both right and left side surfaces of the air conditioning case 31. That is, the foot opening portion 52 is provided on both side surfaces of the air conditioning case 31 in the paper face-back direction in FIG. 1 (i.e., vehicle right-left direction). The front foot opening 52 is connected to a front foot air outlet through right and left foot ducts. Therefore, air from the front foot opening 52 is blown toward the foot area of a passenger on the front seat of the passenger compartment through the right and left foot ducts and the foot air outlet.

The defroster opening 49 is opened and closed by a rotatable plate-like defroster door 53. The defroster door 53 is disposed to switch an opening/closing state between the defroster opening 49 and a communication path 54. Through the communication path 54, air from the front air mixing portion 39 flows toward the front face opening 50 and the front foot opening 52.

Further, a plate-like foot/face switching door 55 is rotatably disposed between the front face opening 50 and an inlet portion of the front foot passage 51 to open and close the front face opening 50 and the inlet portion of the front foot passage 51. In the first embodiment, the defroster door 53 and the foot/face switching doors 55 are front air-outlet mode switching doors.

A side face opening (S. FACE) is also provided adjacent to the front center face opening 50 in the air conditioning unit 30. The side face opening (S. FACE) is provided to always communicate with the front air mixing portion 39 during each air outlet mode of the air conditioning unit 30. That is, even when an air flow toward the front center face opening 50 is shut by the doors 53, 55, a communication passage through which the front air mixing portion 39 and the side face opening communicate with each other is provided by recess portions of the doors 53, 55.

The defroster door 53 and the foot/face switching door 55 are used as a front air-outlet switching unit, and are operatively linked to an air-outlet mode driving unit such as a servomotor through a link mechanism to be operated by the air-outlet mode driving unit.

In the first embodiment, the rear door 45 and the evaporator bypass door 40a are connected to the front air-outlet mode switching unit to be operatively linked with the front air-outlet mode switching unit through a link mechanism. Further, the front and rear air mixing doors 36, 42 are operatively connected to a common temperature-adjustment driving unit such as a servomotor through a link mechanism. The rear air-outlet mode door 48 is also connected to the front air-outlet mode driving unit through a link mechanism to be operatively linked with the front air-outlet mode switching unit.

The first inside/outside air switching door 14 is connected to an inside/outside air driving unit such as a servomotor through a link mechanism to be operated by the inside/outside air driving unit. The first inside/outside air switching door 14 is operated in accordance with an inside/outside air switching signal due to an automatic control or a manual operation described later. On the other hand, the second inside/outside air switching door 15 is operatively linked with the front air-outlet mode switching unit.

Figure 2:
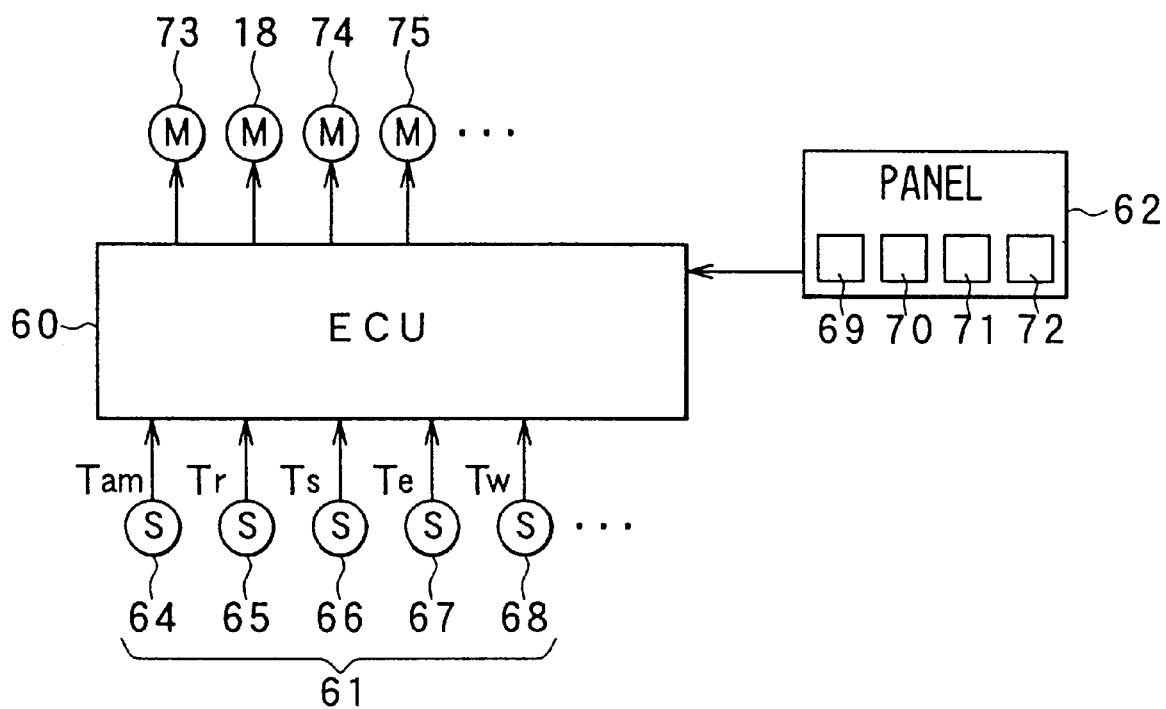
FIG. 2 is a block diagram of an electronic control unit (ECU) according to the first embodiment.

FIG. 2 is a block diagram of an electronic control unit (ECU) 60 according to the first embodiment. In the first embodiment, various components of the vehicle air conditioner are automatically controlled by the ECU 60. The ECU 60 is constructed by a microcomputer and the like to control various components provided in the blower unit 10 and the air conditioning unit 30.

Sensor signals from a sensor group 61 and operation signals from a front operation panel 62 disposed on the instrument panel of the vehicle front side are input into the ECU 60. The sensor group 61 includes an outside air temperature sensor 64 for detecting temperature Tam of outside air outside the passenger compartment, an inside air temperature sensor 65 for detecting temperature Tr of inside air inside the passenger compartment, a sunlight sensor 66 for detecting a sunlight amount Ts entering into the passenger compartment, an evaporator temperature sensor 67 for detecting air temperature Te immediately blown from the evaporator 32, a water temperature sensor 68 for detecting a water temperature Tw flowing into the heater core 33, and the like.

On the front operation panel 62, there are provided with a front temperature setting unit 69, a front air amount setting unit 70, a front air-outlet mode setting unit 71, an inside/outside air mode setting unit 72, and the like. In the first embodiment, because front and rear temperature adjustments and the front and rear mode switching operations are operatively linked, a rear operation panel is not provided.

Control signals from the ECU 60 are output to a driving motor 73 of the first inside/outside air switching door 14, the driving motor 18 of the blower fans 16, 17, a driving motor 74 of the front and rear air mixing doors 36, 42 and a driving motor 75 of the air-outlet mode doors 53, 55, 48. Next, operation of the vehicle air conditioner according to the first embodiment will be now described. In the first embodiment, by setting operation positions of the defroster door 53 and the foot/face switching door 55, the following front air outlet modes can be set.

(1) FACE MODE

Figure 3:
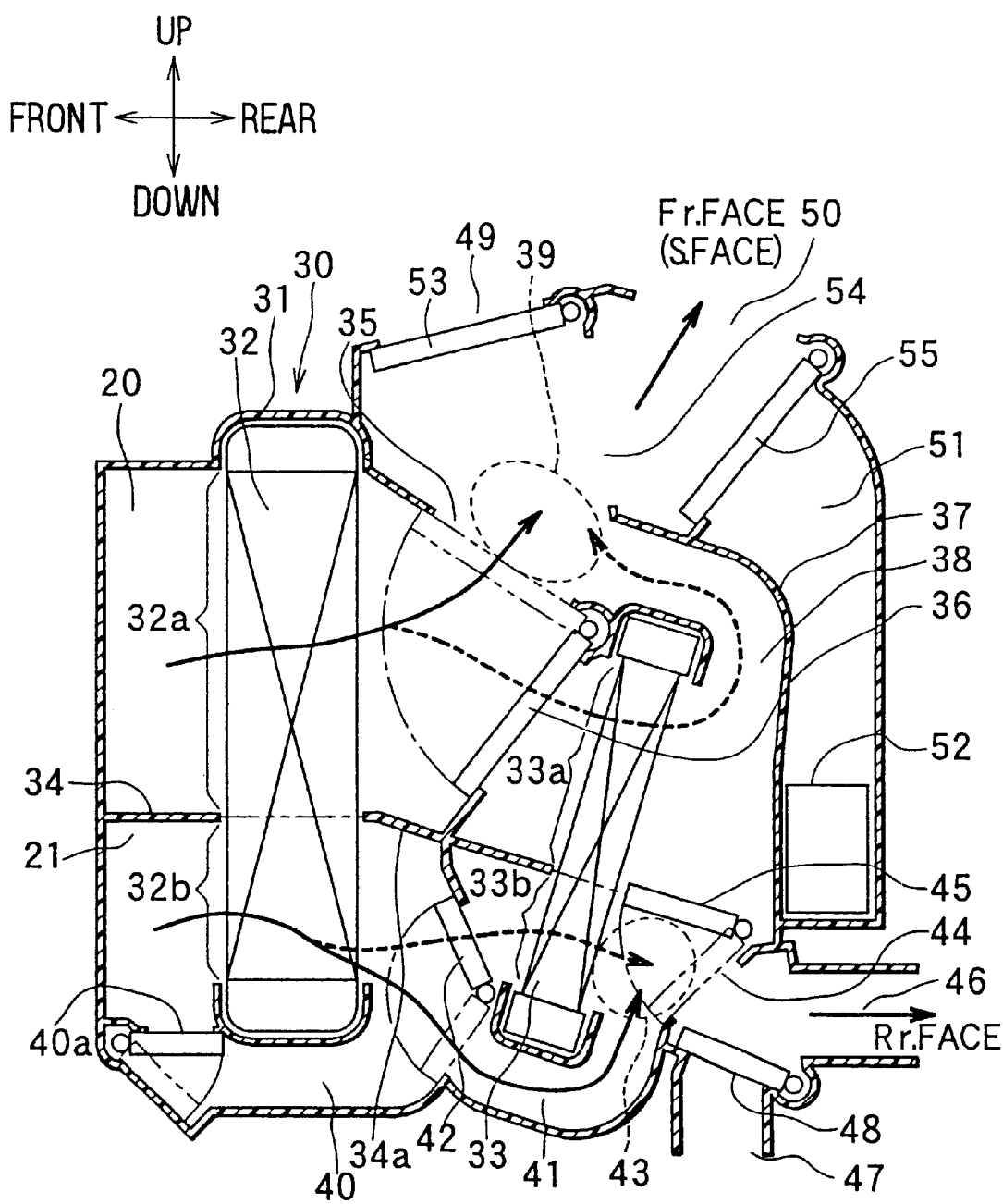
FIG. 3 is a vertical sectional view of an air conditioning unit of the vehicle air conditioner during a face mode according to the first embodiment.

When the face mode is selected based on signals from the front air-outlet mode setting unit 71 or an air-outlet mode calculation result in the ECU 60, each door of the air conditioning unit 30 is operated to the state shown in FIG. 3. That is, the defroster door 53 fully closes the defroster opening 49 and fully opens the communication port 54, while the foot/face switching door 55 closes the inlet portion of the foot air passage 51.

At this time, the rear door 45 is operated to an extending line position of the partition plate 34a. Therefore, the downstream air passage of the heater core 33 is also partitioned by the rear door 45 into the first air passage 20 and the second air passage 21, and the rear opening 44 is opened by the rear door 45. Further, the evaporator bypass door 40a is operated to close the evaporator bypass passage 40, and the rear air-outlet mode switching door 48 is operated to open the rear face opening 46 and to close the rear foot opening 47.

Further, in the blower unit 10, the second inside/outside air switching door 15 is operated to the solid line position in FIG. 1 together with the selection operation of the face mode, so that the second inside air introduction port 12 is opened and the communication path 19 is closed by the inside/outside air switching door 15. On the other hand, the first inside/outside air switching door 14 selects an inside/outside air introduction mode in accordance with an inside/outside air switching signal due to an automatic control of the ECU 60 or a manual operation. When the first inside/outside air switching door 14 is operated to the solid line position in FIG. 1, the first inside/outside air switching door 14 closes the first inside air introduction port 11 and opens the outside air introduction port 13. Therefore, outside air from the outside air introduction port 13 is sucked into the suction port 16a of the first fan 16, and is blown into the first air passage 20. Simultaneously, inside air from the second inside air introduction port 12 is sucked into the suction port 17a of the second fan 17, and is blown into the second air passage 21. Thus, in this case, a double layer flow mode is set between the first air passage 20 for the front seat side and the second air passage 21 for the rear seat side.

In this case, when the front air mixing door 36 is operated to the solid line position in FIG. 3, the upper part 33a of the heater core 33 is fully closed and the front bypass passage 35 is fully opened so that a front maximum cooling is set. With this operation of the front air mixing door 36, the rear air mixing door 42 is operated to the solid line position in FIG. 3, and a rear maximum cooling is set so that the lower part 33b of the heater core 33 is fully closed and the rear bypass passage 41 is fully opened.

Here, when the blower unit 10 and the refrigerant cycle operate, an entire air amount blown from the blower unit 10 is cooled by the evaporator 32 and cool air is obtained. Therefore, in the first air passage 20, the maximum cooling is set. Thus, cool air having cooled in the evaporator 32 passes through the front bypass passage 35, is blown toward the front face opening 50 through the front air mixing portion 39 and the communication port 54, and thereafter, is blown toward the head portion of the passenger on the front seat from the front center face air outlet.

During each air outlet mode, the side face opening (S. FACE) provided adjacent to the front face opening 50 always communicates with the front air mixing portion 39. As a result, during the face mode, cool air from the side face opening is also blown toward right and left both sides of the head portion of the passenger on the front seat of the passenger compartment through the side face air outlet.

On the other hand, in the second air passage 21, the maximum cooling is also set. Therefore, cool air from the evaporator 32 passes through the rear bypass passage 41, is blown toward the rear face opening 46 through the rear air mixing portion 43 and the rear opening 44, and is blown toward the head portion of the passenger on the rear seat from the rear face air outlet.

During the face mode, when the front air mixing door 36 is operated from the solid line position in FIG. 3 (i.e., the maximum cooling position) to a middle position between the solid line position and the chain line position in FIG. 3 for controlling the temperature of air blown into the passenger compartment, a part of cool air passes through the front bypass passage 35 and the other part of cool air flows into the upper part 33a of the heater core 33 to be heated, in accordance with an opening degree of the front air mixing door 36. Air heated in the upper part 33a of the heater core 33 flows through the front warm air passage 38 upwardly. Thus, cool air from the front bypass passage 35 and warm air from the front warm air passage 38 are mixed in the front air mixing portion 39, and conditioned air having a predetermined temperature is obtained.

With the temperature-adjustment operation of the front air mixing door 36, the rear air mixing door 42 is also operated at a middle opening position from the solid line (maximum cooling position). Therefore, cool air from the rear bypass passage 41 and warm air from the lower part 33b of the heater core 33 are mixed in a rear air mixing portion 43, so that conditioned air having a predetermined temperature is obtained. Accordingly, by controlling the operation positions of the front air mixing door 36 and the rear air mixing door 42 between the solid line positions in FIG. 3 (i.e., maximum cooling positions) and the chain line positions (i.e., maximum heating positions) in FIG. 3, temperature of air blown toward the front and rear seat sides of the passenger compartment is controlled.

In the second air passage 21, because low-temperature circulating inside air is sucked, a ventilation loss is decreased. Simultaneously, because an air flow from the outlet of the evaporator 32 toward the rear face opening 46 through the rear air mixing portion 43 is provided approximately linearly, the temperature of cool air toward the rear face opening 46 can be sufficiently decreased, and the air amount blown from the rear face opening 46 can be sufficiently increased. Accordingly, cooling capacity for the rear seat side of the passenger compartment is effectively improved.

During the face mode, when the first inside/outside air switching door 14 is operated to the chain line position in FIG. 1 so that the first inside air introduction port 11 is opened and the outside air introduction port 13 is closed, an entire inside air mode can be set.

(2) BI-LEVEL MODE

Figure 4:
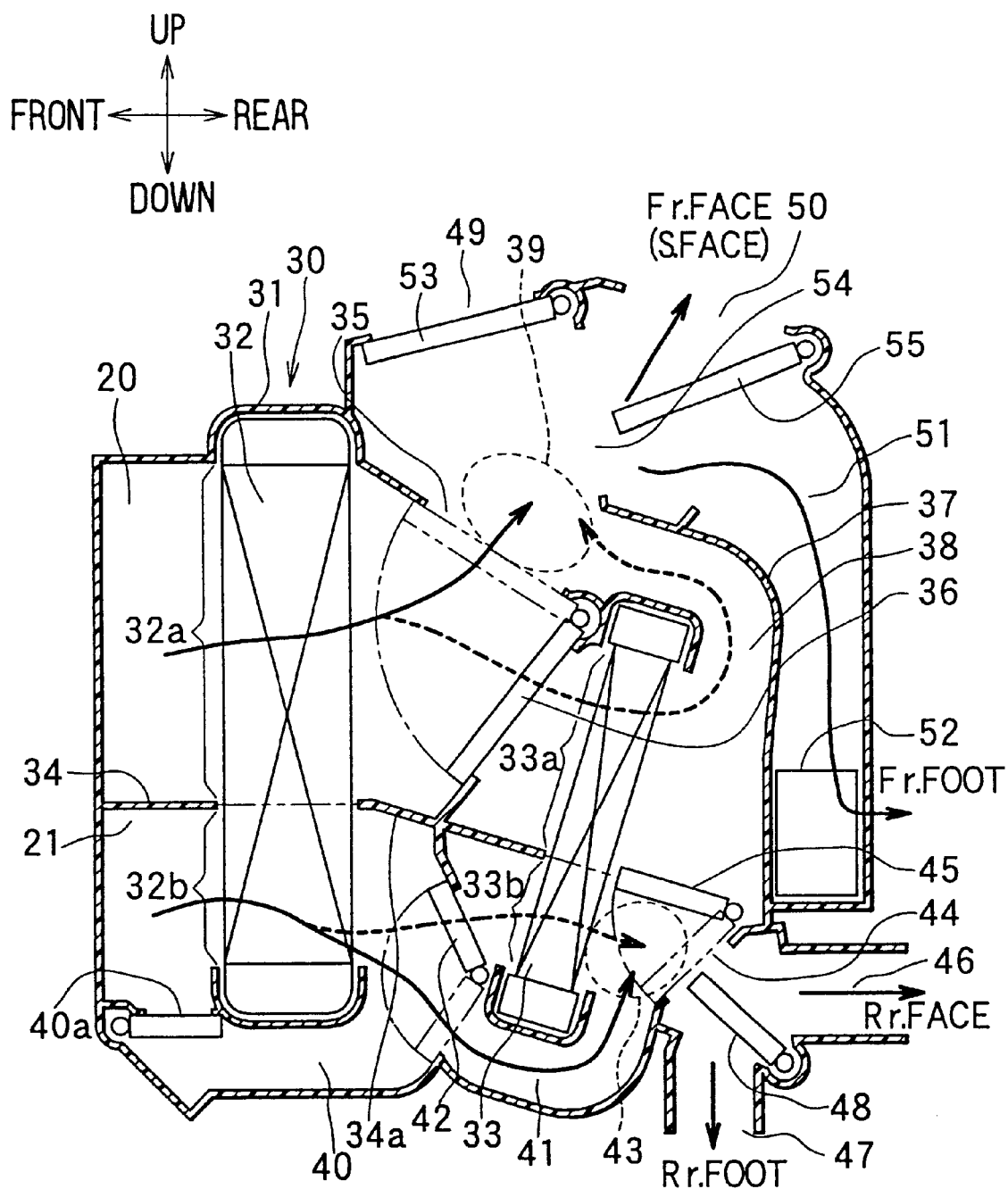
FIG. 4 is a vertical sectional view of the air conditioning unit during a bi-level mode according to the first embodiment.

FIG. 4 shows a state of the air conditioning unit 30 during the bi-level mode. During the bi-level mode, the front foot/face switching door 55 is operated at a middle position where both the front face opening 50 and an inlet portion of the front foot passage 51 are opened. With the operation of the front foot/face switching door 55, the rear air-outlet mode switching door 48 is also operated at a middle position where both the rear face opening 46 and the rear foot opening 47 are opened. In this case, the rear door 45 is also operated to the solid line position in FIG. 3. Thus, conditioned air temperature-adjusted by the front air mixing door 36 is simultaneously blown from the front face opening 50 and the front foot opening 52 toward upper and lower sides of the front seat of the passenger compartment, while conditioned air temperature-adjusted by the rear air mixing door 42 is simultaneously blown from the rear face opening 46 and the rear foot opening 47 toward upper and lower sides of the rear seat in the passenger compartment. During the bi-level mode, the other portions are similar to those during the face mode.

(3) FOOT MODE

Figure 5:
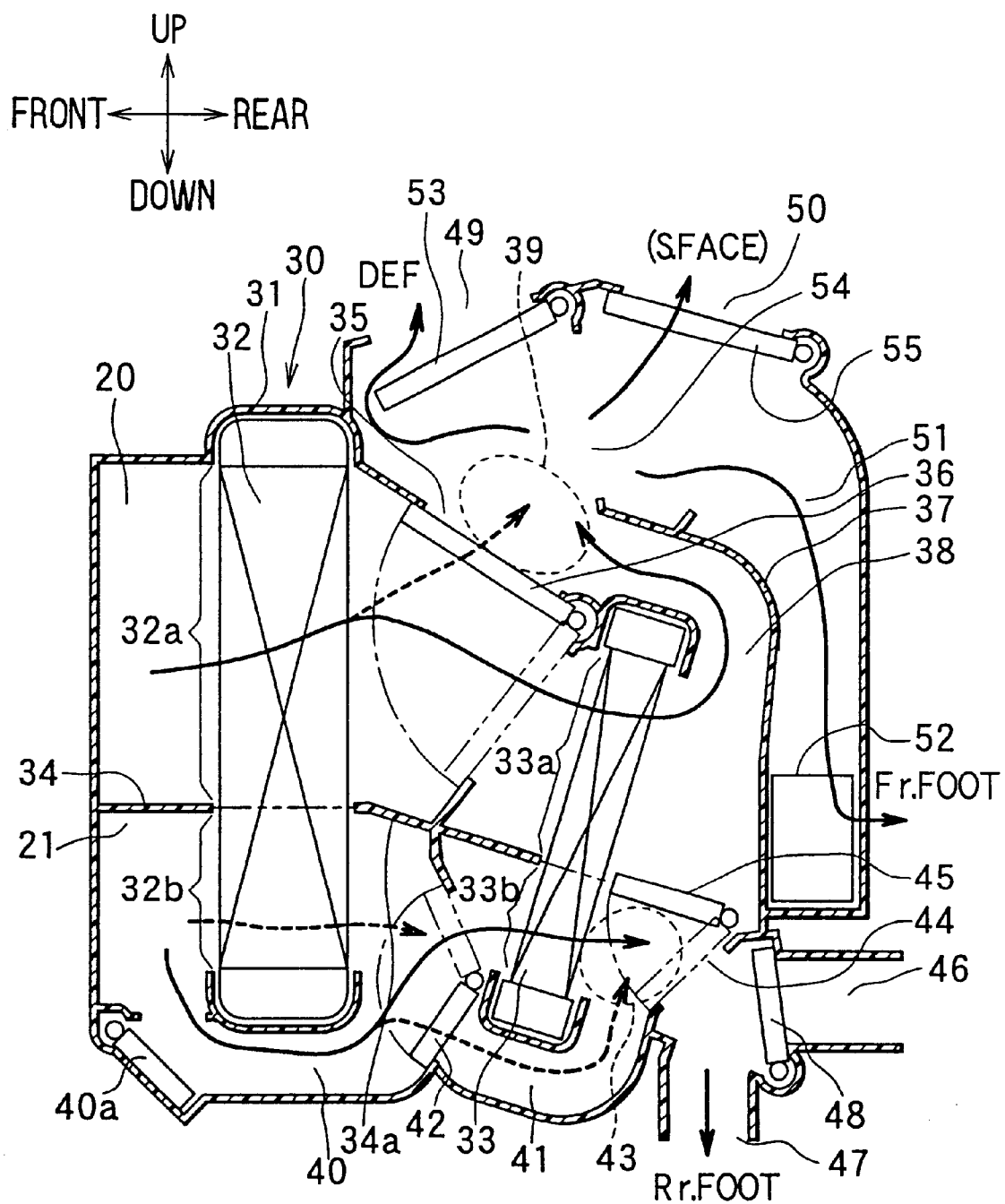
FIG. 5 is a vertical sectional view of the air conditioning unit during a foot mode according to the first embodiment.

FIG. 5 shows a state of the air conditioning unit 30 during the foot mode. During the foot mode, the defroster door 53 is operated at a position where the defroster opening 49 is slightly opened and the communication port 54 is approximately fully opened. Further, the front foot/face switching door 55 fully closes the front face opening 50 and fully opens the inlet portion of the front foot passage 51.

During the foot mode, the evaporator bypass door 40a fully opens the evaporator bypass passage 40, and the rear door 45 is operated to partition the downstream air passage of the heater core 33 into the first air passage 20 and the second air passage 21 and to open the rear opening 44. Further, the rear air-outlet mode switching door 48 closes the rear face opening 46 and opens the rear foot opening 47.

In the blower unit 10, the second inside/outside air switching door 15 is operated to the solid line position in FIG. 1 with the selection operation of the foot mode, so that the second inside air introduction port 12 is opened. In this case, when the first inside/outside air switching door 14 opens the outside air introduction port 13 and closes the first inside air introduction port 11, the double layer flow mode is set between the first air passage 20 for the front seat side and the second air passage 21 for the rear seat side.

At this time, when the front air mixing door 36 is operated at the solid line position in FIG. 5, the front maximum heating is set so that the upper part 33a of the heater core 33 is fully opened and the front bypass passage 35 is fully closed by the front air mixing door 36. With the operation of the front air mixing door 36, the rear air mixing door 42 is also operated to the solid line position in FIG. 5, and the rear maximum heating is set so that the lower part 33b of the heater core 33 is fully opened and the rear bypass passage 41 is fully closed.

In the second air passage 21 for the rear seat side of the passenger compartment, because high-temperature circulating inside air is sucked, a ventilation loss is decreased. Simultaneously, because an air flow from the outlet of the evaporator bypass passage 40 toward the rear foot opening 47 is provided approximately linearly, the temperature of warm air toward the rear foot opening 47 is increased, and the air amount blown from the rear foot opening 47 is increased. Accordingly, heating capacity for the rear seat of the passenger compartment is effectively improved.

Even during the foot mode, the operation positions of the front and rear air mixing doors 36, 42 are controlled between the solid line position (maximum heating position) in FIG. 5 and the chain line position (maximum cooling position) in FIG. 5, the temperature of air blown toward the front seat side and the rear seat side of the passenger compartment is respectively controlled.

During the foot mode, warm air from the front air mixing portion 39 is blown toward the windshield from the defroster opening 49, while being simultaneously blown toward the front passenger's foot area from the front foot opening 52. Further, even in this case, because the side face opening (S. FACE) communicates with the front air mixing portion 39, warm air is also blown from the side face opening toward a portion proximate to a side windshield.

During the foot mode, a ratio of an air amount blown from the defroster opening 49 to an air amount blown from the front foot opening 52 is generally set at approximately 3/7 on the front seat side. However, when the defroster door 53 is rotated in the counterclockwise direction from the position in FIG. 5 so that an opening degree of the defroster opening 49 is increased as compared with that in the foot mode and an opening degree of the communication port 54 is decreased, it is possible to set the ratio between the air amount blown from the defroster opening 49 and the amount blown from the front foot opening at approximately 5/5. Accordingly, in this case, a foot/defroster mode can be set so that defrosting performance of the windshield can be improved as compared with the foot mode. During the foot/defroster mode, the other portions are similar to those during the foot mode.

(4) DEFROSTER MODE

Figure 6:
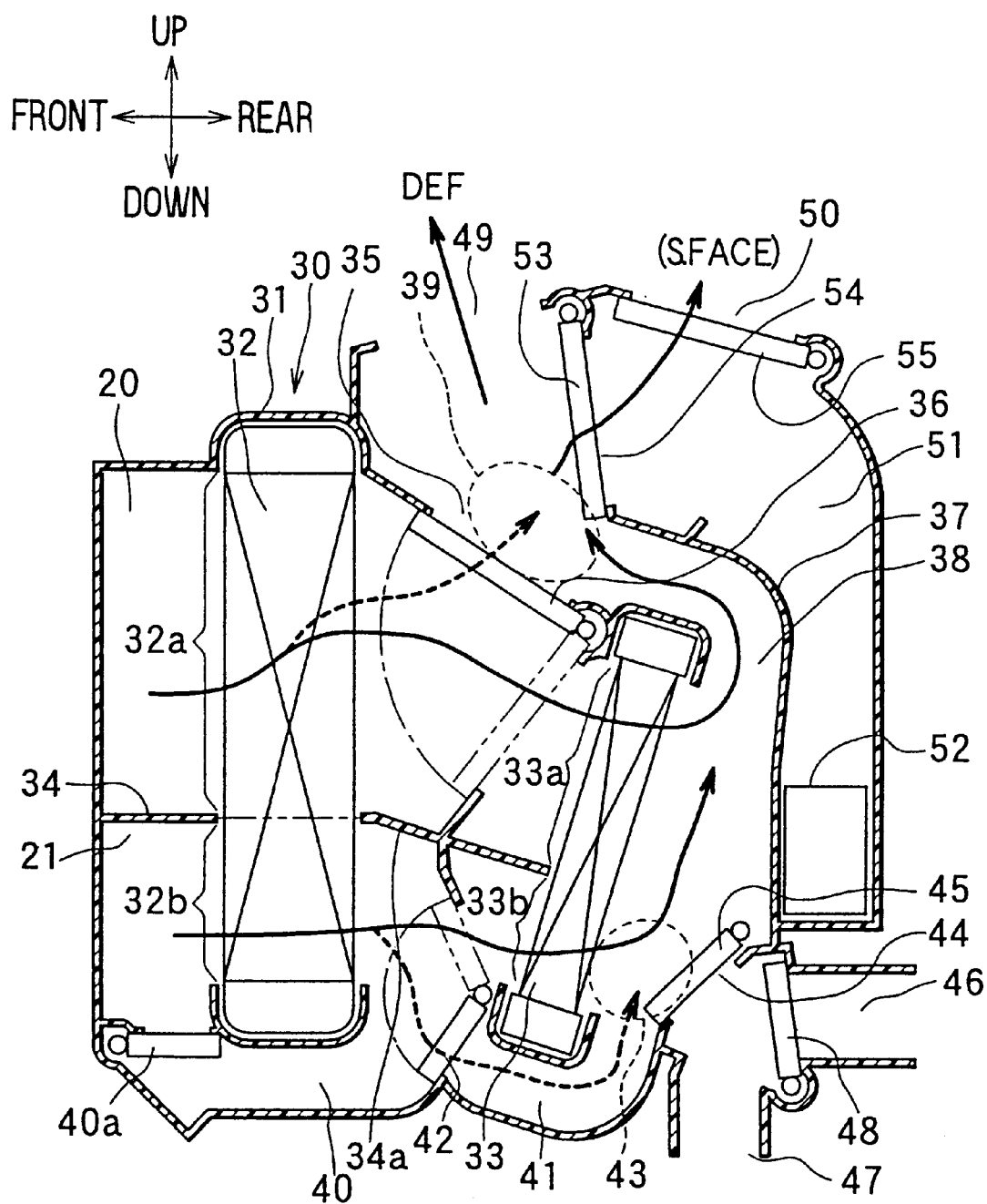
FIG. 6 is a vertical sectional view of the air conditioning unit during a defroster mode according to the first embodiment.

FIG. 6 shows a state of the air conditioning unit 30 during the defroster mode. During the defroster mode, the defroster door 53 is rotated in the counterclockwise direction from the position in FIG. 5 to the position in FIG. 6. Therefore, the defroster door 53 fully opens the defroster opening 49 and fully closes the communication port 54. Further, the front foot/face switching door 55 fully closes the front face opening 50. Even in this case, the side face opening (S. FACE) is maintained at the state communicating with the front air mixing portion 39.

With the selection operation of the defroster mode, the evaporator bypass door 40a fully closes the evaporator bypass passage 40, and the rear door 45 fully closes the rear opening 44.

In the blower unit 10, the second inside/outside air switching door 15 is operated at the chain line position in FIG. 1 to close the second inside air introduction port 12 and to open the communication path 19, together with the selection operation of the defroster mode. In this case, the outside air introduction port 13 is opened by the first inside/outside air switching door 14, and an entire outside air introduction mode where only outside air is blown into both the first and second air passages 20, 21 is set.

Because the evaporator bypass passage 40 is fully closed by the evaporator bypass door 41a, all outside air flowing through the first and second air passages 20, 21 passes through the evaporator 32 to be cooled and dehumidified in maximum by the evaporator 32.

Further, because the rear door 45 fully closes the rear opening 44 as shown by the solid line position in FIG. 6, warm air flowing toward the rear seat side of the passenger compartment is shut, and all outside air having been heated in the heater core 33 is blown toward the defroster opening 49 through the warm air passage 38. Specifically, during the defroster mode, a main part of warm air from the warm air passage 38 is blown toward the front windshield from the defroster opening 49, and the other part of warm air from the warm air passage 38 is blown toward the position near the side windshield from the side face opening (S. FACE).

In this case, when the front and rear air mixing doors 36, 42 are operated to the solid line position in FIG. 6 (i.e., maximum heating position), all outside air having passed through the evaporator 32 in the first and second air passages 20, 21 is heated by the upper part 33a of the heater core 33 in the first air passage 20 and the lower part 33b of the heater core 33 in the second air passage 21 in maximum, and is blown toward the front windshield and the side windshield to perform defrosting operation.

Thus, even in the vehicle air conditioner having both a front air-blowing structure for blowing air toward the front seat side and a rear air-blowing structure for blowing air toward the rear seat side, defrosting performance for defrosting the windshield is improved in maximum, by using the whole defrosting capacity of the evaporator 32 and the whole heating capacity of the heater core 33.

In the above-described first embodiment, the rear air-outlet mode door 48 can be operatively linked with the front air-outlet mode doors 53, 55 while the front air mixing door 36 is operatively linked with the rear air mixing door 42, so that a door driving mechanism can be made simple. In this case, the opening degree of the rear air mixing door 42 is corrected relative to the opening degree of the front air mixing door 38. Therefore, heat loss generated in the rear duct can be canceled.

For example, during the foot mode, the opening degree of the rear air mixing door 42 is corrected to a high-temperature side relative to the opening degree of the front air mixing door 36, so that a decrease of air temperature blown toward the rear foot area, due to the heat loss in the rear duct, is restricted. Further, during the face mode, the opening degree of the rear air mixing door 42 is corrected to low-temperature side relative to the opening degree of the front air mixing door 36, so that an increase of air temperature blown toward the rear face area, due to the heat loss in the rear duct, is restricted. As a result, even in the vehicle air conditioner having both the front air-blowing structure for the front seat side and the rear air-blowing structure for the rear seat side, comfortable air-conditioning performance is obtained on the rear seat side of the passenger compartment.

In the above-described first embodiment, during the double layer flow mode, the partition state between the first air passage 20 for the front seat side and the second air passage 21 for the rear seat side indicates an approximate perfect partition state. However, the partition state includes a slight mixing state between outside air in the first air passage 20 and inside air in the second air passage 21.

A second preferred embodiment of the present invention will be now described with reference to FIG. 7. In the second embodiment, the rear air mixing door 42, the rear door 45 and the rear air-outlet mode switching door 48 described in the first embodiment are not provided, and the structure of the second air passage 21 is made simple.

That is, only the rear face opening 46 is provided for blowing air toward the rear seat side in a vehicle air conditioner of the second embodiment. In this case, a temperature adjustment of air blown toward the rear seat side of the passenger compartment is performed only in a low-temperature area in the summer. Therefore, it is unnecessary to provide a heat-exchanging portion of the heater core 33 in the second air passage 21. In the second embodiment, because the evaporator bypass door 40a is used as a temperature adjustment unit for adjusting the temperature of air blown from the rear face opening 46, a rotation center of the evaporator bypass door 40a is disposed at a lower front surface position of the evaporator 32.

In the second air passage 21, by adjusting the opening degree of the evaporator bypass door 40a, a ratio between an amount of cool air passing through the lower part 32b of the evaporator 32 and non-cooled air (i.e., sucked air of the blower unit) passing through the evaporator bypass passage 40 is adjusted, so that the temperature of air blown from the rear face opening 46 is adjusted. In the second air passage 21, cool air from the lower part 32b of the evaporator 32 and non-cooled air from the evaporator bypass passage 40 are mixed in an air mixing portion 80, and the mixed air approximately linearly flows from the air mixing portion 80 toward the rear face opening 46 through the rear bypass passage 41. Therefore, air blown toward the rear face opening 46 has a small pressure loss, and the air amount blowing toward the rear seat side from the rear face opening 46 is increased. Thus, in the second embodiment, cooling capacity for the rear seat side of the passenger compartment is improved.

Figure 7:
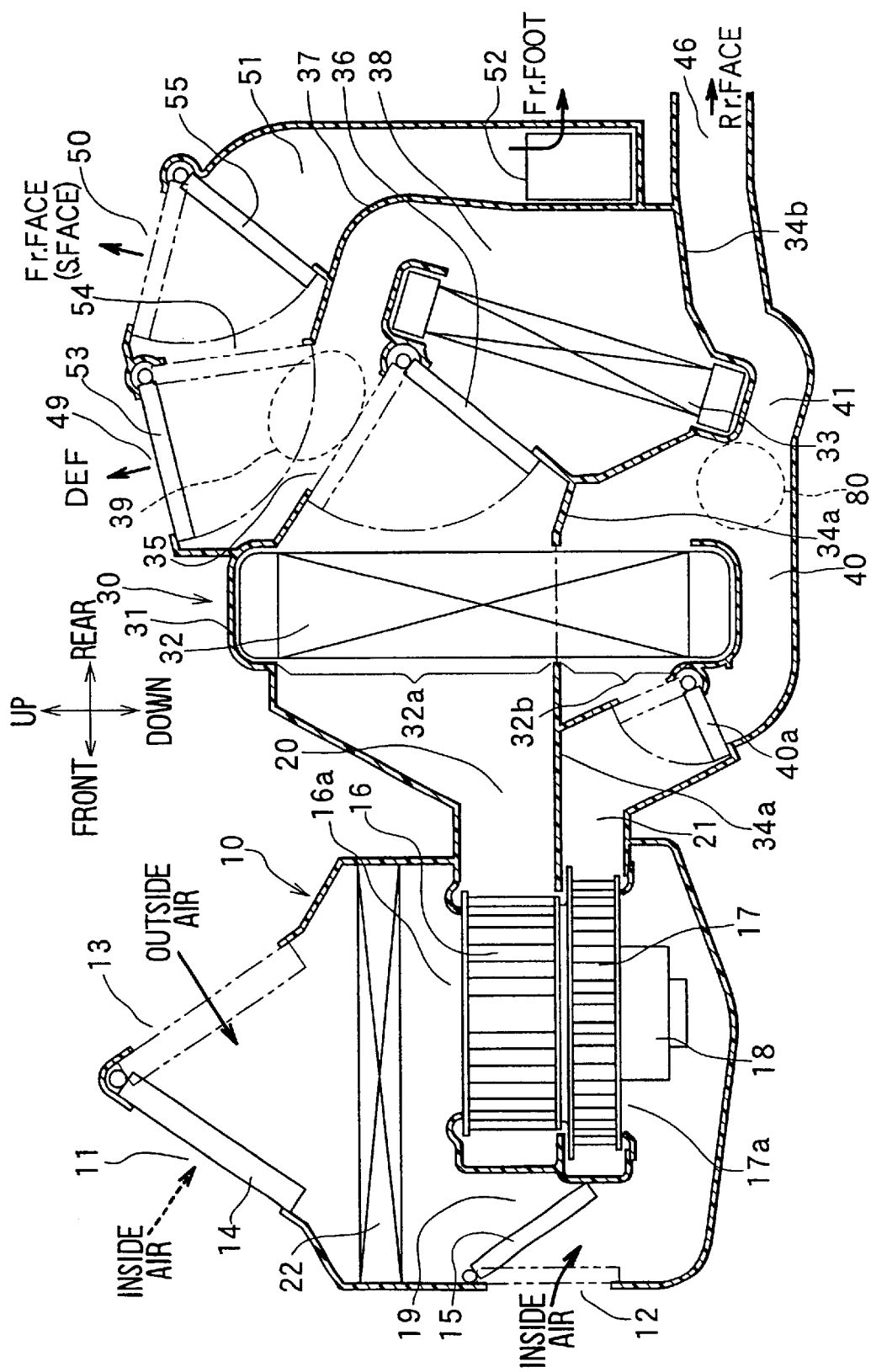
FIG. 7 is a schematic sectional view of a ventilation system of a vehicle air conditioner according to a second preferred embodiment of the present invention.

When the evaporator bypass door 40a is operated to the chain line position in FIG. 7 to fully close the lower part 32b of the evaporator 32, air blown from the rear face opening 46 is the sucked air in the blower unit 10. Therefore, in this case, the temperature of air blown from the rear face opening 46 becomes highest. Conversely, when the evaporator bypass door 40a is operated to the solid line position in FIG. 7 to fully open the lower part 32b of the evaporator 32, air blown from the rear face opening 46 is the blown air from the evaporator 32. Therefore, in this case, the temperature of air blown from the rear face opening 46 becomes lowest.

According to the second embodiment of the present invention, by the adjustment of the opening degree of the evaporator bypass door 40a, the temperature of air blown from the rear face opening 46 can be adjusted in a range between the temperature of sucked air in the blower unit 10 and the temperature of air blown from the evaporator 32. When the double layer flow mode is set and inside air is introduced from the second air passage 12, the temperature of air blown from the rear face opening 46 is adjusted in a range between the inside air temperature and the temperature of cool air blown from the evaporator 32.

On the other hand, when the entire outside air mode is set so that only outside air is sucked from the first and second fans 16, 17 with the switching operation of the second inside/outside air switching door 15, the temperature of air blown from the rear face opening 46 is adjusted in a range between the outside air temperature and the temperature of cool air blown from the evaporator 32.

In the second embodiment of the present invention, a partition plate 34b is disposed at a downstream air side of the heater core 33 to define a rear air passage communicating with the rear bypass passage 41 and the warm air passage 38. However, the rear door 45 of the first embodiment may be provided to be used as a movable partition plate, instead of the partition plate 34b. In this case, when the rear air passage toward the rear face opening 46 is closed by the rear door 45 so that the rear bypass passage 41 communicates with the warm air passage 38, a front precedence mode is set so that cool air cooled by the lower part 32b of the evaporator 32 in the second air passage 21 flows toward the front seat side of the passenger compartment from the rear bypass passage 41 through the warm air passage 38. In the second embodiment, the other portions are similar to those in the above-described first embodiment.

A third preferred embodiment of the present invention will be now described with reference to FIG. 8. In the third embodiment, only the rear foot opening 47 is provided for the rear seat side of the passenger compartment, and the rear air-outlet mode switching door 48 of the first embodiment is not provided. Therefore, in a vehicle air conditioner of the third embodiment, a temperature adjustment of air blown toward the rear seat side of the passenger compartment is performed in a high-temperature area in the winter. That is, the vehicle air conditioner of the third embodiment is used for only setting a heating mode. In this case, the evaporator bypass door 40a is operated to the solid line position in FIG. 8 to fully open the evaporator bypass passage 40. Therefore, air blown from the second fan 17 passes through the evaporator bypass passage 40 with a small pressure loss, and flows from the evaporator bypass passage 40 toward the rear foot opening 47 through the rear air mixing portion 43. Thus, air is blown from the rear foot opening 47 with a small pressure loss.

Further, by the adjustment of the opening degree of the rear air mixing door 42, a ratio between an air amount passing through the rear bypass passage 41 and an air amount passing through the lower part 33b of the heater core 33 is adjusted so that the temperature of air blown from the rear foot opening 47 is adjusted.

When the double layer flow mode is set and inside air is introduced from the second air passage 12 in the blower unit 10, the temperature of air blown from the rear foot opening 47 is adjusted in a range between the inside air temperature and the temperature of warm air blown from the heater core 33.

On the other hand, when the entire outside air mode is set so that only outside air is sucked from the first and second fans 16, 17 with the switching operation of the second inside/outside air switching door 15, the temperature of air blown from the rear foot opening 47 is adjusted by the temperature adjustment between outside air and warm air blown from the heater core 33.

Figure 8:
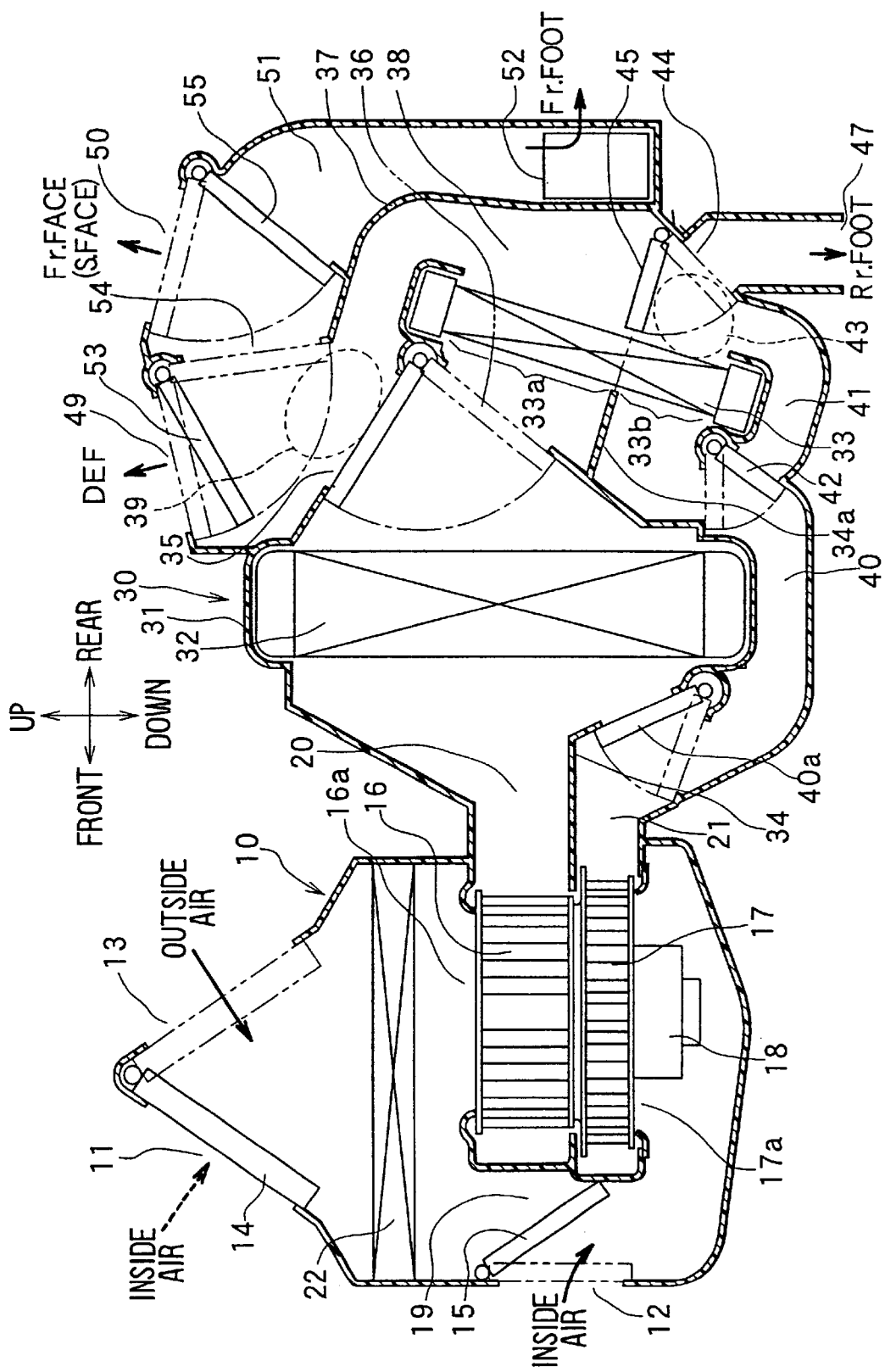
FIG. 8 is a schematic sectional view of a ventilation system of a vehicle air conditioner according to a third preferred embodiment of the present invention.

In the third embodiment, during the face mode, the evaporator bypass door 40a is operated to the chain line position in FIG. 8 to fully close the evaporator bypass passage 40. Therefore, air blown by the second fan 17 in the second air passage 21 passes through a lower part of the evaporator 32 to be cooled and is blown toward the front air mixing portion 39. Thus, cooling performance for the front seat side of the passenger compartment is improved.

Further, during the defroster mode, the rear door 45 is operated to the chain line position in FIG. 8 to fully close the rear foot opening 47, so that the defrosting performance for the windshield is improved as described in the first embodiment. In the third embodiment, the other portions are similar to those in the above-described first embodiment.

A fourth preferred embodiment of the present invention will be now described with reference to FIGS. 9–14. In the above-described first embodiment, during the double layer flow mode, inside air passing through the second air passage 21 is blown from only the rear openings 46, 47 for the rear seat side. However, in the fourth embodiment, during the double layer flow mode, inside air is blown from both the rear openings 46, 47 and the front foot opening 52.

First, a specific structure of the heater core 33 will be now described. The heater core 33 is the whole-pass type (i.e., one-way flow type), and includes an inlet tank 33c, an outlet tank 33d and a core portion 33g between both the inlet tank 33c and the outlet tank 33d. A hot water inlet 33e is provided in the inlet tank 33c, and a hot water outlet 33f is provided in the outlet tank 33d. The core portion 33g includes plural flat tubes and plural corrugated fins each of which is disposed between adjacent flat tubes so that the flat tubes and the corrugated fins are alternately laminated in parallel with each other.

In the heater core 33, hot water from the inlet tank 33c passes through the whole flat tubes upwardly toward the outlet tank 33d. Therefore, temperature of hot water flowing through the heater core 33 and temperature of air blown from the heater core are decreased toward an upper side from a lower side of the heater core 33. The heater core 33 described in the first through third embodiment may have the same structure as that of the fourth embodiment.

Here, different points different from the first embodiment are mainly described. In the fourth embodiment, the lower part 32b is made larger than the upper part 32a in the core portion of the evaporator 32. As front air mixing doors, a main air mixing door 36a and a supplementary air mixing door 36b are disposed. In the fourth embodiment, both the front air mixing doors 36a, 36b are plate-like doors operatively linked with each other through a link mechanism. When both the front air mixing doors 36a, 36b are rotated to the solid line positions in FIG. 9, the maximum cooling is set. During the maximum cooling, both the front air mixing doors 36a, 36b fully close the upper part 33a of the heater core 33 and fully open the front bypass passage 35. On the other hand, when both the front air mixing doors 36a, 36b are rotated to the chain line positions in FIG. 9, the maximum heating is set. During the maximum heating, both the front air mixing doors 36a, 36b fully open the upper part 33a of the heater core 33 and fully close the front bypass passage 35. The upper part 33a of the heater core 33 in the first air passage 20 and the lower part 33b of the heater core 33 in the second air passage 21 are partitioned into by the partition plate 34b and the rear door 45.

A plate-like warm air bypass door 81 is rotatably disposed on a downstream air side of the heater core 33 at a middle portion of the upper part 33a. The warm air bypass door 81 is used as both a switching member for switching a warm air bypass opening 82 and a partition member for partitioning the upper part 33a of the heater core 33 into two parts.

Figure 9:
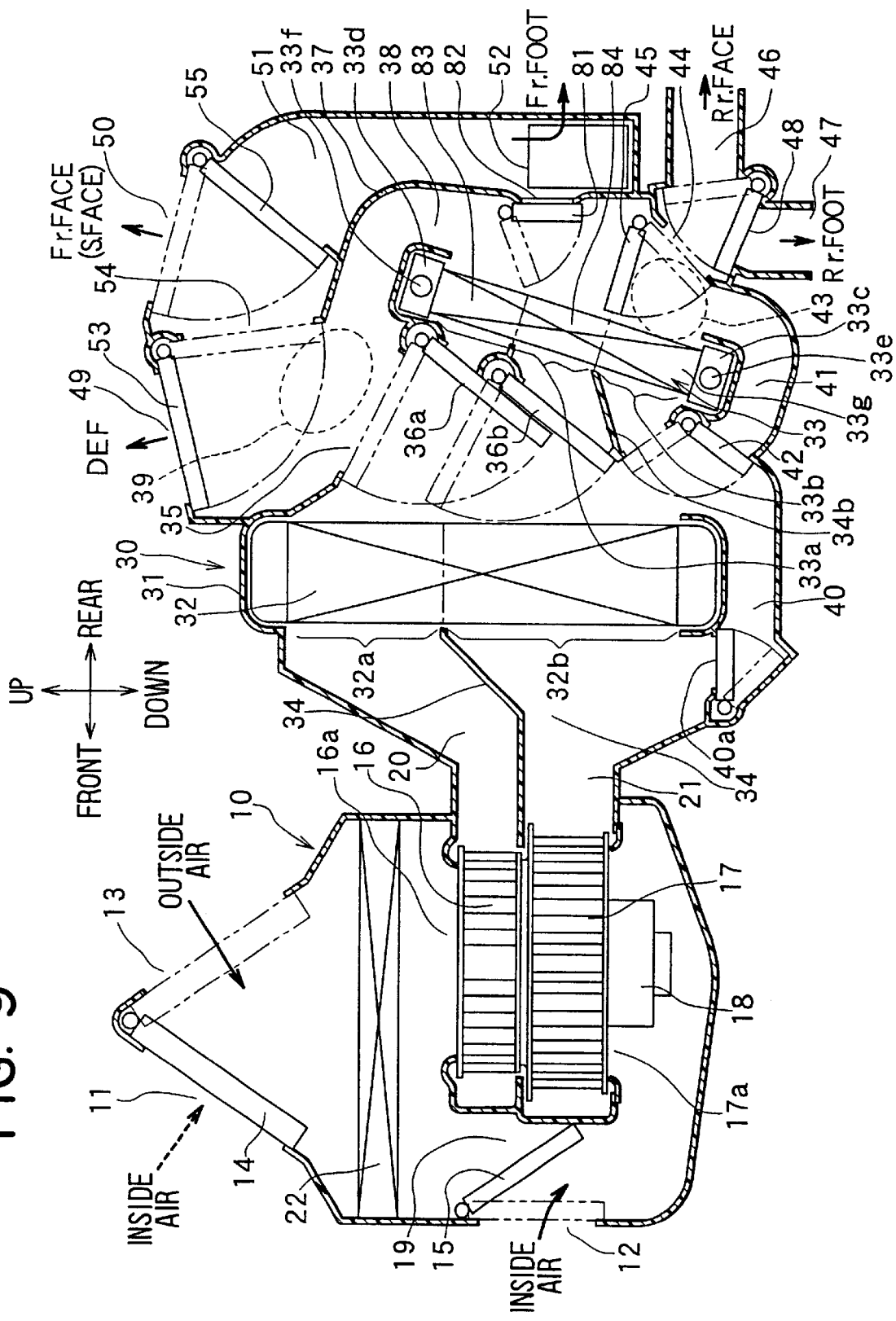
FIG. 9 is a schematic sectional view of a ventilation system of a vehicle air conditioner according to a fourth preferred embodiment of the present invention.

That is, when the warm air bypass door 81 is operated to the chain line position in FIG. 9, the warm air bypass opening 82 is opened, and simultaneously, a downstream passage of the upper part 33a of the heater core 33 is partitioned into a first front side passage (outside air passage) 83 and a second front side passage (inside air passage) 84. The warm air bypass opening 82 is provided in the partition wall 37 so that the second front side passage (inside air passage) 84 among the warm air passage 38 directly communicates with the front foot opening 52 through the warm air bypass opening 82.

In the fourth embodiment, the warm air bypass door 81 is operated to the chain line position in FIG. 9 to set a double layer flow mode for the front-seat side air passage, when both the front air mixing doors 36a, 36b are operated to the maximum heating positions during the foot mode or the foot/defroster mode.

Figure 12:
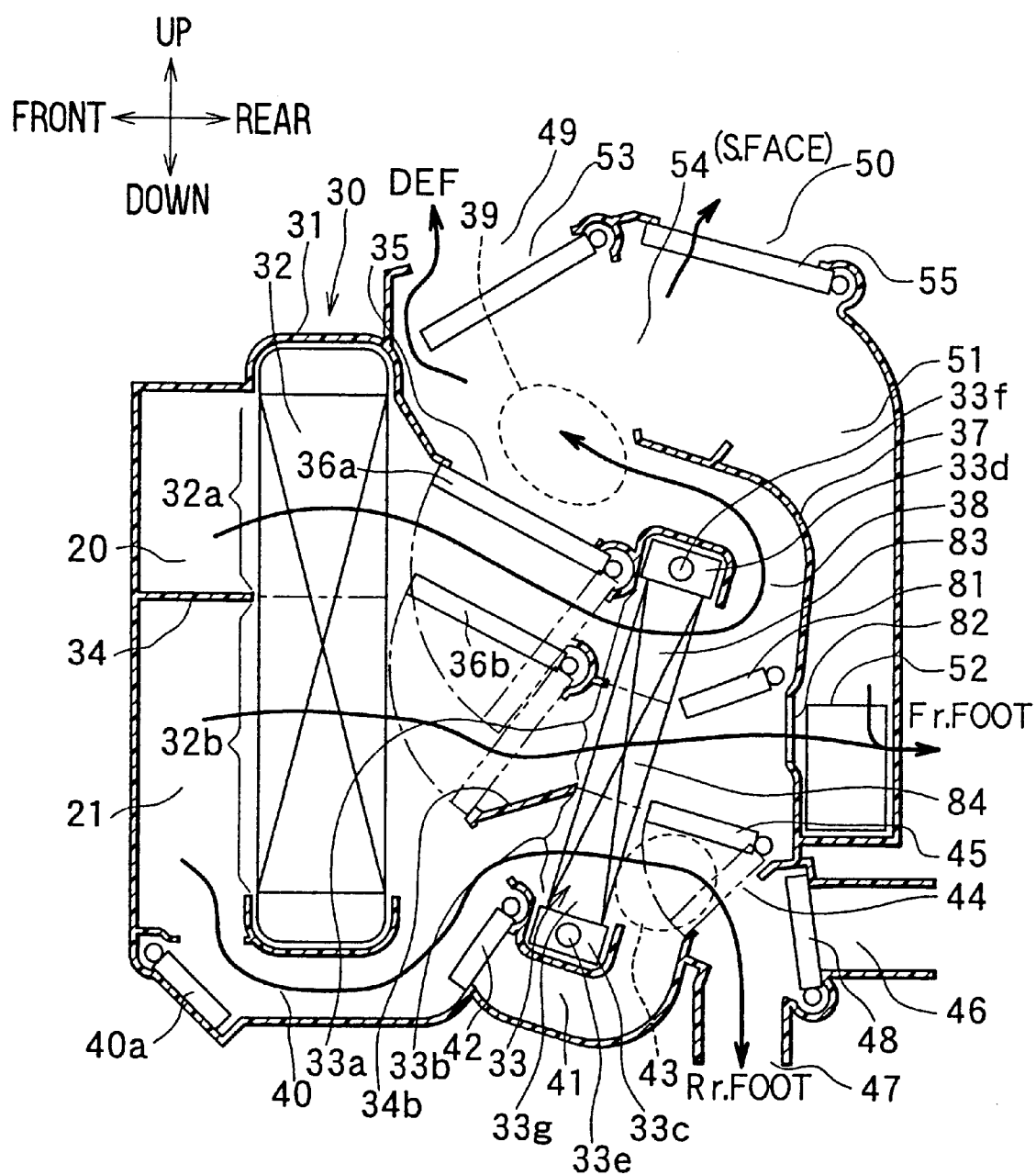
FIG. 12 is a vertical sectional view of the air conditioning unit when a maximum heating is set during a foot mode according to the fourth embodiment.

At the maximum heating positions of the main and supplementary front air mixing doors 36a, 36b shown in FIG. 12, an upstream air passage of the upper part 33a of the heater core 33 is further partitioned into the first front side passage (outside air passage) 83 and the second front side passage (inside air passage) 84 by the supplementary air mixing door 36b.

Figure 10:
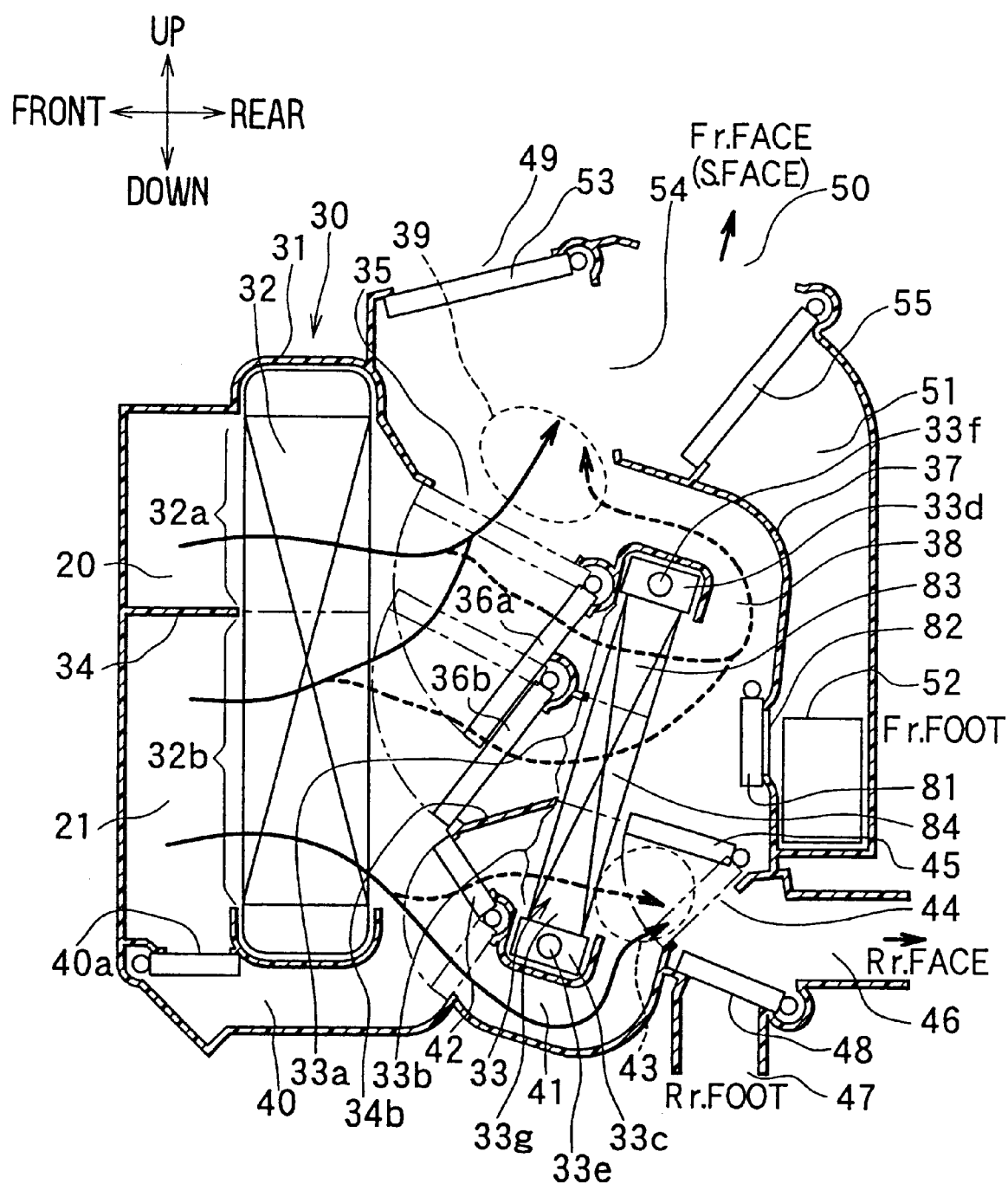
FIG. 10 is a vertical sectional view of an air conditioning unit of the vehicle air conditioner during a face mode according to the fourth embodiment.

FIG. 10 shows an air conditioning unit of a vehicle air conditioner during the face mode according to the fourth embodiment. During the face mode, air from the front face opening 50 and the side face opening (S. FACE) is blown toward the head portion of a passenger on the front seat of the passenger compartment. Simultaneously, air from the rear face opening 46 is blown toward the head portion of a passenger on the rear seat of the passenger compartment.

That is, during the face mode, because the warm air bypass door 81 is operated to close the warm air bypass opening 82, all warm air passing through the upper part 33a of the heater core 33 flows toward the front air mixing portion 39 when both the front air mixing doors 36a, 36b opens the upper part 33a of the heater core 33. During the face mode, because the evaporator bypass door 40a fully closes the evaporator bypass passage 40, all air blown by the blower unit passes through the evaporator 32. Therefore, the temperature of air blown toward the front seat side of the passenger compartment is adjusted by adjusting the opening degrees of the front air mixing doors 36a, 36b, while the temperature of air blown toward the rear seat side of the passenger compartment is adjusted by adjusting the opening degree of the rear air mixing door 42.

During the face mode, when the rear door 45 is operated to the solid line position in FIG. 10, the temperature of air blown toward the front seat side of the passenger compartment and the temperature of air blown toward the rear seat side of the passenger compartment are respectively controlled. However, the rear door 45 may be operated to the chain line position in FIG. 10, and the front precedence mode may be set. During the front precedence mode, all air blown by the blower unit 10 flows toward the front seat side of the passenger compartment, and the air amount blown toward the front seat side of the passenger compartment is increased, as compared with the general face mode.

Figure 11:
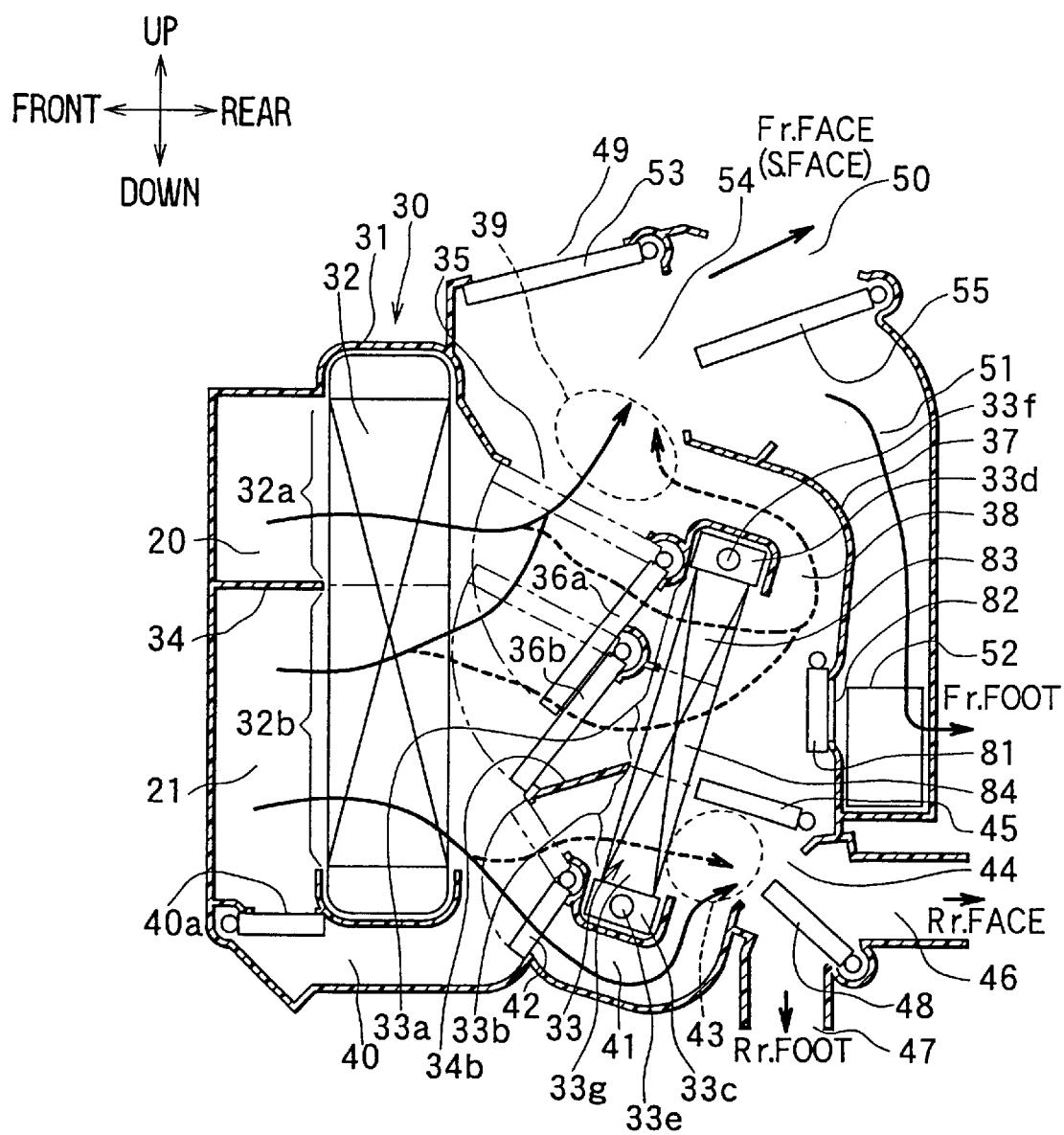
FIG. 11 is a vertical sectional view of the air conditioning unit during a bi-level mode according to the fourth embodiment.

FIG. 11 shows the air conditioning unit during the bi-level mode according to the fourth embodiment. During the bi-level mode, the front foot/face switching door 55 is operated to a middle position to open both the front face opening 50 and the front foot opening 52, and the rear air-outlet mode switching door 48 is operated to a middle position to open both the rear face opening 46 and the rear foot opening 47. temperature adjustment of air blown into the passenger compartment is similar to that in the above described face mode in the fourth embodiment.

FIG. 12 shows the air conditioning unit when the maximum heating is set during the foot mode according to the fourth embodiment. When the maximum heating is set during the foot mode so that the front air mixing doors 36a, 36b are operated to the solid line position in FIG. 12, the warm air bypass door 81 is operated to the solid line position in FIG. 12 to open the warm air bypass opening 82 and to partition the first front side passage 83 and the second front side passage 84 on the downstream air side of the heater core 33. Simultaneously, the first front side passage 83 and the second front side passage 84 are partitioned by the supplementary front air mixing door 36b on the upstream air side of the heater core 33.

Thus, outside air in the first air passage 20 is heated by the heater core 33 in the first front side passage 83, and is blown toward the windshield through the defroster opening 49 and the front side face opening (not shown). On the other hand, a part of inside air in the second air passage 21 is heated by the heater core 33 in the second front side passage 84, and is blown toward the front foot area in the passenger compartment from the front foot opening 52 through the warm air bypass opening 82. Simultaneously, the other part of inside air in the second air passage 21 is heated by the lower part 33b of the heater core 33, and is blown toward rear foot area of the passenger compartment through the rear foot opening 47.

As a result, air pressure loss is further reduced, and the heating effect for the lower sides of the front seat and the rear seat of the passenger compartment is improved. Further, because the evaporator bypass door 40a fully opens the evaporator bypass passage 40, air pressure loss in the second air passage 21 (i.e., inside air passage) is decreased, and the amount of inside air blown into the passenger compartment is improved. Therefore, even in a vehicle having a diesel engine in which water temperature is difficult to be increased, heating performance for the passenger compartment is effectively improved. Simultaneously, because outside air having a low humidity is blown toward the windshield, defrosting performance of the windshield is effectively improved.

Further, in the fourth embodiment, the temperature of hot water flowing through the heater core 33 is decreased in order of the lower part 33b, the part in the second front side passage 84 and the part in the first front side passage 83. Among the three parts of the heater core 33, the temperature of hot water flowing through the lower part 33b of the heater core 33 becomes maximum. All inside air heated in the lower part 33bof the heater core 33 is blown toward the rear seat side of the passenger compartment without being mixed into inside air blown toward the front seat side of the passenger compartment. Thus, temperature of air blown toward the front seat side can be effectively increased, and heating performance for the rear seat side can be further improved.

Figure 13:
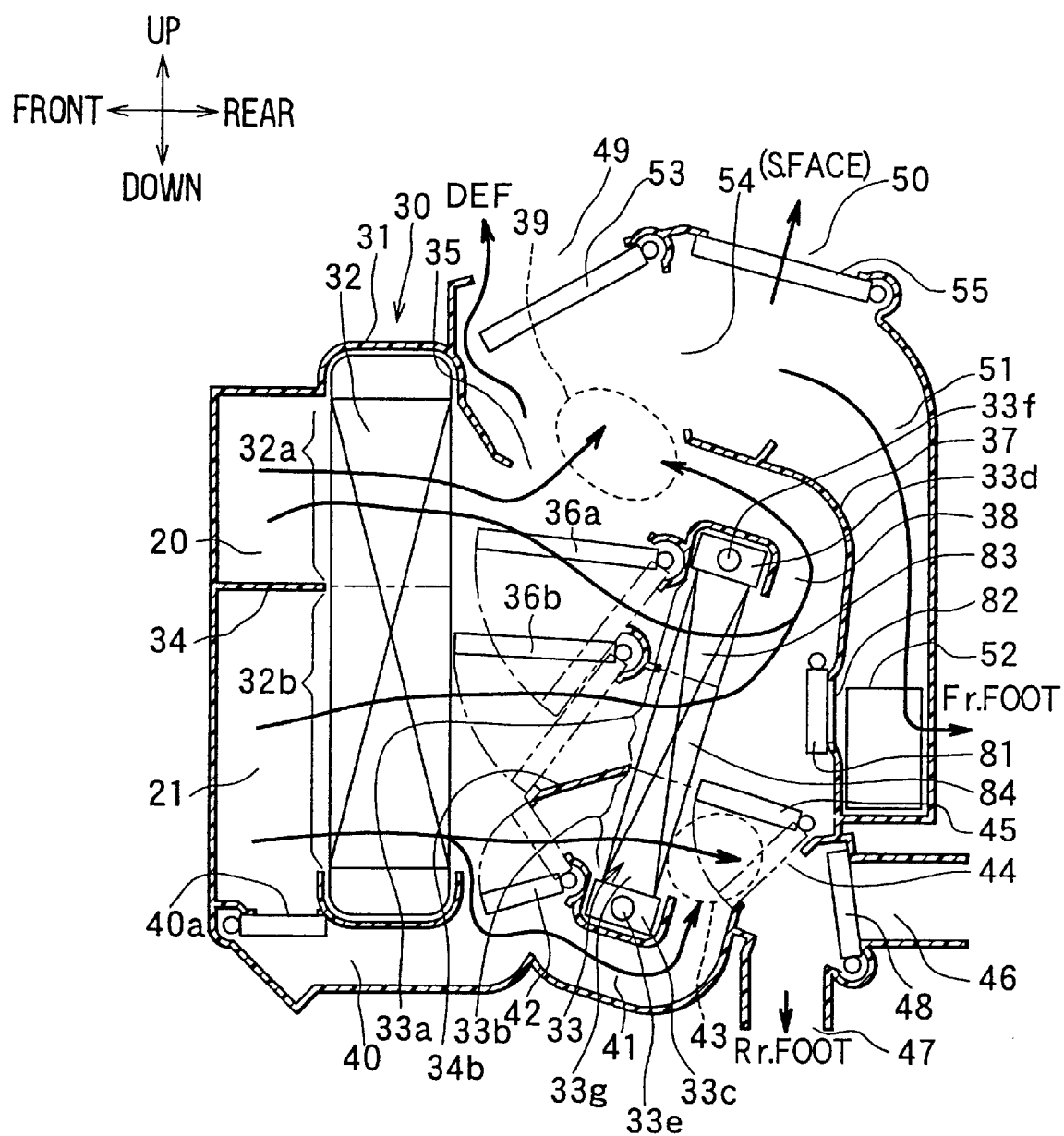
FIG. 13 is a vertical sectional view of the air conditioning unit when a middle temperature control area is set during the foot mode according to the fourth embodiment.

FIG. 13 shows the air conditioning unit when a middle temperature control area is set during the foot mode according to the fourth embodiment. During the foot mode, when the front air mixing doors 36a, 36b are operated to a middle temperature control position so that a middle temperature control area is set, the warm air bypass door 81 is operated to close the warm air bypass opening 82. Further, the evaporator bypass door 40a is operated to close the evaporator bypass passage 40 so that all air blown by the blower unit 10 passes through the evaporator 32. Thus, temperature of low-temperature air blown into the passenger compartment can be controlled to be decreased to the temperature of air blown from the evaporator 32.

When an inside/outside air introduction mode is set in the blower unit 10 so that outside air flows through the first air passage 20 and inside air flows through the second air passage 21, mixed air in which a part of inside air from the second air passage 21 is mixed into outside air in the first air passage 20 is blown into the front seat side of the passenger compartment through the defroster opening 49, the front side face opening and the front foot opening 52. On the other hand, only inside air in the second air passage 21 is blown from the rear foot opening 47.

In the middle temperature control area during the foot mode shown in FIG. 13, when the entire outside air introduction mode is set, only outside air is blown toward the front seat side and the rear seat side in the passenger compartment. On the other hand, when the entire inside air introduction mode is set, only inside air is blown toward the front seat side and the rear seat side in the passenger compartment.

Figure 14:
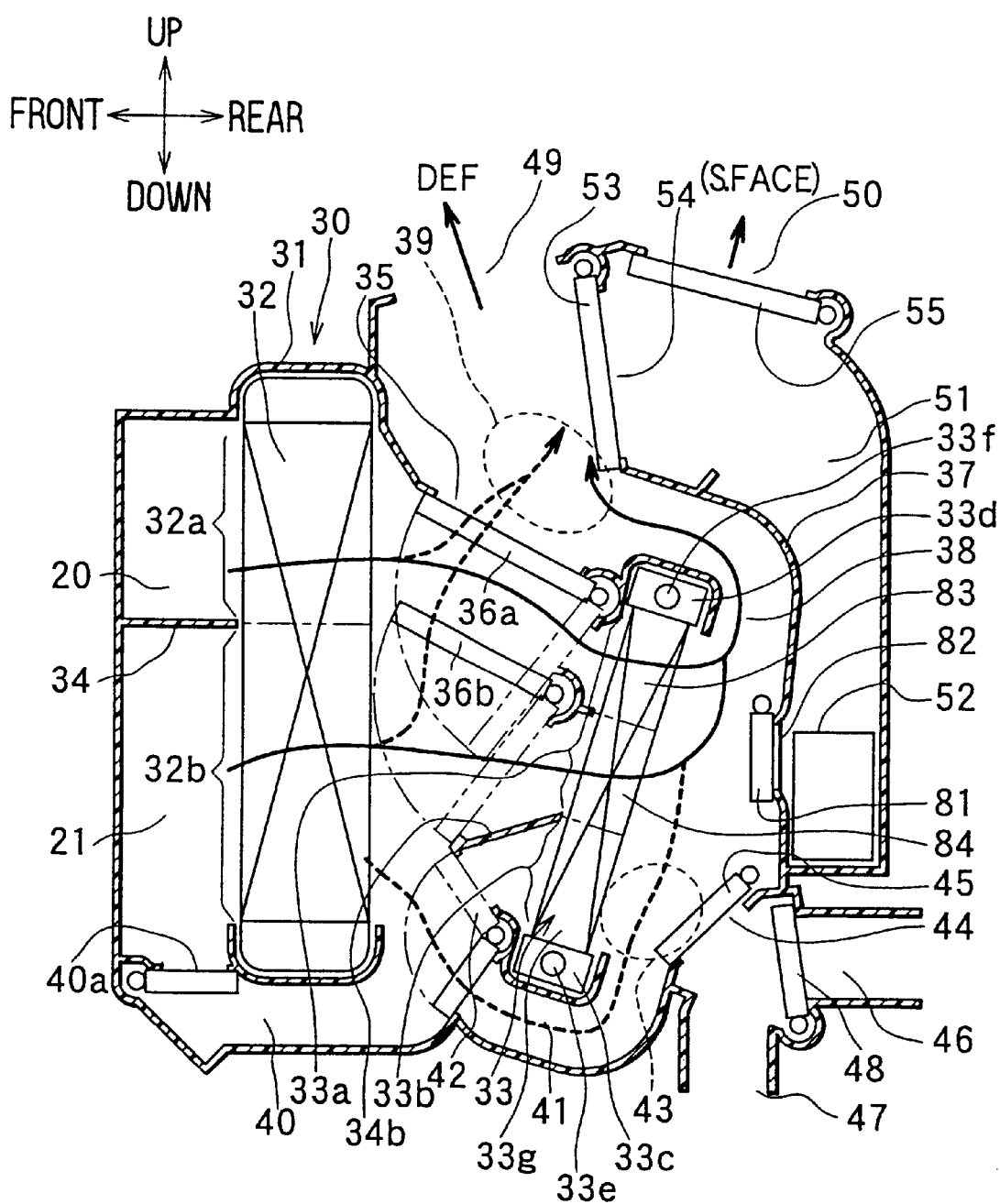
FIG. 14 is a vertical sectional view of the air conditioning unit during a defroster mode according to the fourth embodiment.

FIG. 14 shows the air conditioning unit during the defroster mode according to the fourth embodiment. During the defroster mode, the evaporator bypass door 40a fully closes the evaporator bypass passage 40, and the rear door 45 fully closes the rear opening 44. Further, in the blower unit 10, the entire outside air introduction mode is set so that only outside air flows through the first and second air passages 20, 21.

In this case, outside air in the first and second air passages 20, 21 passes through the evaporator 32 to be cooled and dehumidified. Further, because the rear door 45 fully closes the rear opening 44, an air flow toward the rear seat side of the passenger compartment is shut, and all outside air can be blown by the blower unit 10 toward the defroster opening 49 after passing through the evaporator 32 and the heater core 33. Thus, defrosting capacity of the windshield is effectively improved.

Even in the defroster mode, by adjusting the opening degrees of the front and rear air mixing doors 36a, 36b, 42, the temperature of air blown into the passenger compartment is adjusted in a range between the temperature of air blown from heater core 33 and the temperature of air blown from the evaporator 32.

In the fourth embodiment, during an air outlet mode except for the defroster mode, the rear door 45 is operated to close the rear opening 44. However, when the rear door 45 is operated to always close the rear opening 44, the front precedence mode is set so that the air flow toward the rear seat side of the passenger compartment is shut and the air amount flowing toward the front seat side of the passenger compartment is increased.

Although the present invention has been fully described in connection with the preferred embodiments thereof with reference to the accompanying drawings, it is to be noted that various changes and modifications will become apparent to those skilled in the art.

For example, in the above-described first through fourth embodiments, the air mixing doors 36, 36a, 36b, 42 are used as the temperature adjustment unit. However, as the temperature adjustment unit, a hot water valve for adjusting an amount or a temperature of hot water flowing into the heater core 33 may be used.

In each embodiment of the present invention, the front air mixing doors 36, 36a, 36b and the rear air mixing door 42 are operatively linked, and the front air-outlet mode door 53, 55 and the rear air-outlet mode door 48 are operatively linked. However, relative to the front air mixing doors 36, 36a, 36b and the front air-outlet mode door 53, 55, the rear air mixing door 42 and the rear air-outlet mode door 48 may be respectively independently disposed. Therefore, the rear temperature adjustment and the rear air-outlet mode switching operation can be independently performed relative to the front temperature adjustment and the front air-outlet mode switching operation. In this case, it may be necessary to provide a rear operation panel on the rear seat side in the passenger compartment, similarly to the front operation panel 62.

Similarly, the second inside/outside air switching door 15 and the rear-door 45 may be controlled independently with the operations of the front air-outlet mode doors 53, 55.

In each of the above-described embodiments of the present invention, the second inside/outside air switching door 15 may be not provided, and may be fixed to the solid line position in FIG. 1 so that inside air is always introduced from the second inside air introduction port 12 into the second air passage 21.

In each of the above-described embodiments of the present invention, the rear air mixing door 42 may be omitted. In this case, the air-conditioning capacity (e.g., cooling capacity, heating capacity) for the rear seat side of the passenger compartment may be adjusted by adjusting the air amount flowing toward the rear seat side of the passenger compartment due to the rear door 45 and the like.

In each of the above-described embodiments of the present invention, the evaporator bypass door 40a is operatively linked with the air-outlet mode switching operation. However, the evaporator bypass door 40a may be operated by the other methods. For example, in an operation stop condition of the refrigerant cycle having the evaporator 32, that is, when the compressor operation switch is turned off when the outside air temperature Tam is lower than a predetermined temperature (e.g., Tam≦0° C.) during the outside air mode in the winter, the evaporator bypass door 40a is operated to open the evaporator bypass passage 40, thereby reducing the pressure loss of air in the second air passage 21. Further, the opening/closing operation control of the evaporator bypass door 40a may be performed as described below. When the air temperature Tin sucked into the evaporator 32 is approximately equal to the air temperature Te blown from the evaporator 32 (Tin=Te), it is determined by the ECU 60 that air is not needed to be introduced into the evaporator 32, and the evaporator bypass door 40a may be automatically operated to open the evaporator bypass passage 40.

Further, when the rear temperature adjustment for the rear seat side and the front temperature adjustment for the front seat side are independently respectively performed, the temperature of air blown toward the rear seat side of the passenger compartment may be adjusted by the rear air mixing door 42 while the evaporator bypass door 40a is operated to open the evaporator bypass passage 40.

In the first embodiment shown in FIG. 1, during the face mode, the evaporator bypass door 40a is operated to always close the evaporator bypass passage 40, and the temperature of air blown toward the rear seat side is adjusted by the rear air mixing door 42. However, in a temperature control area during the face mode, the rear air mixing door 42 may be fixed to the maximum cooling position, and the temperature of air blown toward the rear seat side of the passenger compartment may be adjusted by adjusting the opening degree of the evaporator bypass door 40a. In this case, the air amount passing through the evaporator 32 is decreased, a necessary cooling capacity in the evaporator 32 is decreased, and consumption power in the evaporator 32 is decreased.

When the evaporator bypass door 40a is used as the temperature adjustment unit for the rear seat side similarly to the second embodiment in FIG. 7, a temperature sensor for detecting the temperature of mixed air between an evaporator-bypassing air and an evaporator-passing air may be provided at a downstream air side of the evaporator 32 in the second air passage 21, and the opening degree of the evaporator bypass door 40a may be automatically controlled based on the detected temperature of the temperature sensor.

In the above-described first embodiment, during the foot mode (or foot/defroster mode), the evaporator bypass door 40a is operated to always open the evaporator bypass passage 40. However, when a specific foot mode for mainly cooling the foot area of the passenger compartment is set during the cooling mode in the summer, the cool air bypass door 40a may be operated to close the evaporator bypass passage 40. Further, only when the maximum heating is set during the foot mode (or foot/defroster mode), the evaporator bypass door 40a may be operated to open the evaporator bypass passage 40.

Similarly, even during the defroster mode, only when the maximum heating is set, the evaporator bypass door 40a may be operated to open the evaporator bypass passage 40

In the above-described embodiments of the present invention, the present invention is applied to a vehicle air conditioner having the blower unit 10 in which the double layer flow mode can be set. However, the present invention may be applied to a vehicle air conditioner having a blower unit in which it is impossible to set the double layer flow mode. In this case, the partition plate extending from the blower unit 10 to an upstream air side of the evaporator 32 is unnecessary.

Such changes and modifications are to be understood as being within the scope of the present invention as defined by the appended claims.

What is claimed is:

1. An air conditioner for a vehicle having a passenger compartment, said air conditioner comprising:

a case for defining an air passage through which air flows into the passenger compartment, said case at one end side having an outside air introduction port from which outside air outside the passenger compartment is introduced and an inside air introduction port from which inside air inside the passenger compartment is introduced, and at the other end side having a front air opening for blowing air toward a front seat side of the passenger compartment and a rear air opening for blowing air toward a rear seat side of the passenger compartment, said front air opening including a front face opening for blowing air toward an upper front side of the passenger compartment, a front foot opening for blowing air toward a lower front side of the passenger compartment and a defroster opening for blowing air toward an inner surface of a windshield of the vehicle;

a blower unit for blowing inside air and outside air while partitioning inside air and outside air from each other;

a partition member for partitioning said air passage into a first air passage through which outside air from said outside air introduction port flows into said front air opening by said blower unit, and a second air passage through which inside air from said inside air introduction port flows into said rear air opening by said blower unit, when both said outside air introduction port and said inside air introduction port are opened;

a heating heat exchanger for heating air flowing through said first air passage and said second air passage; and a switching unit which selectively opens and closes said front face opening, said front foot opening and said defroster opening to at least set a first mode where both said front face opening and said front foot opening are opened, and a second mode where both said defroster opening and said front foot opening are opened, wherein, when said partition member partitions said first air passage and said second air passage from each other during a double layer flow mode, inside air in said second air passage flows into said rear air opening, and outside air in said first air passage flows into both said front face opening and said front foot opening among said front air opening in said first mode and flows into both said front foot opening and said defroster opening among said front air opening in said second mode.

2. The air conditioner according to claim 1, wherein said heating heat exchanger is disposed to heat outside air in said first air passage and to heat inside air in said second air passage, during the double layer flow mode.

3. The air conditioner according to claim 1, wherein:

said blower unit includes a first fan for blowing air into said first air passage, and a second fan for blowing air into the second air passage;

said second fan has a fan height lower than that of said first fan; and said second fan has a radial diameter larger than that of said first fan.

4. The air conditioner according to claim 1, further comprising:

a first temperature adjustment unit for adjusting a heating-air amount of said heating heat exchanger in said first air passage to adjust temperature of air blown from said front air opening; and a second temperature adjustment unit for adjusting a heating-air amount of said heating heat exchanger in said second air passage to adjust temperature of air blown from said rear air opening.

5. The air conditioner according to claim 4, further comprising a single driving unit for driving said first temperature adjustment unit and said second temperature adjustment unit, wherein said first temperature adjustment unit and said second temperature adjustment unit are operatively linked with each other through said driving unit.

6. The air conditioner according to claim 4, wherein:

said first temperature adjustment unit is a first air mixing door for adjusting a ratio between an air amount passing through said heating heat exchanger and an air amount bypassing said heating heat exchanger in said first air passage;

said second temperature adjustment unit is a second air mixing door for adjusting a ratio between an air amount passing through said heating heat exchanger and an air amount bypassing said heating heat exchanger in said second air passage; and said second air passage has a rear air mixing portion at a downstream air side of said heating heat exchanger, in which air having passed through said heating heat exchanger in said second air passage and air bypassing said heating heat exchanger in said second air passage are mixed.

7. The air conditioner according to claim 1, further comprising a rear door disposed at a downstream air side of said heating heat exchanger to open and close said rear air opening, wherein:

said rear door opens said rear air opening when being operated to partition said first air passage and said second air passage; and when said rear door closes said rear opening, said first air passage and said second air passage communicate with each other at a downstream air side of said heating heat exchanger.

8. The air conditioner according to claim 1, further comprising:

a cooling heat exchanger disposed at an upstream air side of said heating heat exchanger, for cooling air passing through said first air passage and said second air passage, wherein said cooling heat exchanger is disposed in said case to form a first bypass passage through which air flowing through said second air passage bypasses said cooling heat exchanger.

9. The air conditioner according to claim 8, further comprising a bypass door for opening and closing said first bypass passage.

10. The air conditioner according to claim 1, wherein:

said rear air opening has a rear face opening for blowing air toward a rear upper side of the passenger compartment, and a rear foot opening for blowing air toward a rear lower side of the passenger compartment; and when said partition member is positioned to partition said first air passage and said second air passage from each other, inside air is blown from said inside air introduction port into both said rear face opening and said rear foot opening through said second air passage when both said rear face opening and said rear foot opening are opened.

11. The air conditioner according to claim 10, further comprising:

a first temperature adjustment unit for adjusting a heating-air amount of said heating heat exchanger in said first air passage to adjust temperature of air blown from said front air opening; and a second temperature adjustment unit for adjusting a heating-air amount of said heating heat exchanger in said second air passage to adjust temperature of air blown from said rear air opening, wherein said first temperature adjustment unit and said second temperature adjustment unit are disposed in such a manner that the temperature of air blown from said rear air opening is higher than that of air blown from said front air opening during a foot mode where at least said front foot opening and said rear foot opening are opened.

12. The air conditioner according to claim 10, further comprising:

a first temperature adjustment unit for adjusting a heating-air amount of said heating heat exchanger in said first air passage to adjust temperature of air blown from said front air opening; and a second temperature adjustment unit for adjusting a heating-air amount of said heating heat exchanger in said second air passage to adjust temperature of air blown from said rear air opening, wherein said first temperature adjustment unit and said second temperature adjustment unit are disposed in such a manner that the temperature of air blown from said rear air opening is lower than that of air blown from said front air opening during a face mode where at least said front face opening and said rear face opening are opened.

13. An air conditioner for a vehicle having a passenger compartment, said air conditioner comprising:

a case for defining an air passage through which air flows into the passenger compartment, said case having a front air opening for blowing air toward a front seat side of the passenger compartment and a rear air opening for blowing air toward a rear seat side of the passenger compartment, said front air opening including at least a defroster opening for blowing air toward an inner surface of a windshield of the vehicle;

a blower unit for blowing inside air inside the passenger compartment and outside air outside the passenger compartment to partition inside air and outside air from each other;

a partition member for partitioning said air passage into a first air passage through which outside air flows by said blower unit, and a second air passage through which inside air flows by said blower unit;

a heating heat exchanger for heating air flowing through said first air passage and said second air passage;

a cooling heat exchanger disposed at an upstream air side of said heating heat exchanger, for cooling air passing through said first air passage and said second air passage, said cooling heat exchanger being disposed in said case to form a first bypass passage through which air flowing through said second air passage bypasses said cooling heat exchanger; and a bypass door for opening and closing said first bypass passage, wherein said partition member is disposed in such a manner that outside air in said first air passage flows into said front air opening and inside air in said second air passage flows into said rear air opening while partitioning said rear air opening and said front air opening, during a double layer flow mode;

said front air opening further includes a front foot opening for blowing air toward a front lower side of the passenger compartment;

said rear air opening includes a rear foot opening for blowing air toward a rear lower side of the passenger compartment; and said bypass door opens said first bypass opening, during a foot mode in which air is blown from said front foot opening and said rear foot opening.

14. The air conditioner according to claim 13, wherein:

when said bypass door opens said first bypass passage, the temperature of air blown toward the rear seat side from said second air passage is adjusted by adjusting the heating-air amount of said heating heat exchanger in a temperature range between temperature of air sucked into said second air passage and temperature of air blown from said heating heat exchanger in said second air passage.

15. An air conditioner for a vehicle having a passenger compartment, said air conditioner comprising:

a case for defining an air passage through which air flows into the passenger compartment, said case having a front air opening for blowing air toward a front seat side of the passenger compartment and a rear air opening for blowing air toward a rear seat side of the passenger compartment, said front air opening including at least a defroster opening for blowing air toward an inner surface of a windshield of the vehicle;

a blower unit for blowing inside air inside the passenger compartment and outside air outside the passenger compartment to partition inside air and outside air from each other;

a partition member for partitioning said air passage into a first air passage through which outside air flows by said blower unit, and a second air passage through which inside air flows by said blower unit;

a heating heat exchanger for heating air flowing through said first air passage and said second air passage, a first temperature adjustment unit for adjusting a heating-air amount of said heating heat exchanger in said first air passage to adjust temperature of air blown from said front air opening; and a second temperature adjustment unit for adjusting a heating-air amount of said heating heat exchanger in said second air passage to adjust temperature of air blown from said rear air opening;

a cooling heat exchanger disposed at an upstream air side of said heating heat exchanger in said first and second air passages, for cooling air passing through said first and second air passages, wherein:

said partition member is disposed in such a manner that outside air in said first air passage flows into said front air opening and inside air in said second air passage flows into said rear air opening while partitioning said rear air opening and said front air opening, during a double layer flow mode;

said cooling heat exchanger is disposed to form a first bypass passage through which air bypasses said cooling heat exchanger in said second air passage, said first bypass passage being opened and closed by a bypass door;

said heating heat exchanger is disposed to form a second bypass passage through which air bypasses said heating heat exchanger in said second air passage;

said second temperature adjustment unit is a rear air mixing door for adjusting a ratio between an air amount passing through said heating heat exchanger and an air amount passing through said second bypass passage in said second air passage; and when said rear air mixing door fully opens said second bypass passage and closes an air-flowing passage of said heating heat exchanger in said second air passage, said bypass door adjusts an opening degree of said first bypass passage to adjust the temperature of air blown toward the rear seat side from said second air passage in a temperature area between temperature of air sucked into said second air passage and temperature of air blown from said cooling heat exchange.

16. The air conditioner according to claim 15, wherein:

said heating heat exchanger is disposed in said first air passage to form a third bypass passage through which air bypasses said heating heat exchanger in said first air passage; and said first temperature adjustment unit is a front air mixing door for adjusting a ratio between an air amount passing through said heating heat exchanger and an air amount passing through said third bypass passage in said first air passage.

* * * * *

UNITED STATES PATENT AND TRADEMARK OFFICE
CERTIFICATE OF CORRECTION

PATENT NO. : 6,311,763 B1
DATED : November 6, 2001
INVENTOR(S) : Yukio Uemura et al.

It is certified that error appears in the above-identified patent and that said Letters Patent is hereby corrected as shown below:

Title page,
Item [30], Foreign Application Priority Data, "(JP) 12-045138" should be -- (JP) 2000-045138 --

Signed and Sealed this

Sixteenth Day of April, 2002

Attest:

JAMES E. ROGAN
*Attesting Officer*   *Director of the United States Patent and Trademark Office*